(12) United States Patent
Endres et al.

(10) Patent No.: US 6,875,940 B2
(45) Date of Patent: Apr. 5, 2005

(54) ROBUST ROCKER SWITCH MECHANISM

(75) Inventors: Paul Endres, Plainview, NY (US); Stephen R. Kurek, Rego Park, NY (US); Anthony Tufano, North Massapequa, NY (US); Dennis Oddsen, Eatons Neck, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 57 days.

(21) Appl. No.: 10/627,224

(22) Filed: Jul. 25, 2003

(65) Prior Publication Data

US 2005/0016825 A1 Jan. 27, 2005

(51) Int. Cl.$^7$ .............................................. H01H 13/00
(52) U.S. Cl. ........................ 200/339; 200/523; 200/6 R
(58) Field of Search ................................ 200/339, 6 R, 200/315, 553, 525, 523, 547

(56) References Cited

U.S. PATENT DOCUMENTS

| | | | | |
|---|---|---|---|---|
| 4,870,230 A | * | 9/1989 | Osika et al. ................ 200/6 R |
| 5,136,132 A | * | 8/1992 | Kitchen ...................... 200/525 |
| 5,191,971 A | * | 3/1993 | Hakkarainen et al. ...... 200/550 |
| 5,669,488 A | * | 9/1997 | Burger ........................ 200/528 |
| 5,720,379 A | * | 2/1998 | Schwartz et al. ......... 200/318.1 |
| 5,743,387 A | * | 4/1998 | Hung ......................... 200/571 |

\* cited by examiner

Primary Examiner—K. Lee
(74) Attorney, Agent, or Firm—Paul J. Sutton

(57) ABSTRACT

There is disclosed a robust on-off rocker paddle switch operated by pushing on the lower portion of a rocker paddle to turn the switch "on" or "off". The lower edge of the rocker paddle pivots in and out about its top or upper edge. Bias means urges the lower portion of the rocker paddle to always be in its out position whether the switch is in the "on" state or position or the "off" state or position. The rocker paddle of the switch is not located within a frame and the surface of the switch has, along its vertical axis, a contour of positive first differential and zero second differential, comprised of a combination of splines which extend between points of varying distances from a datum plane. The contour has zero second differential when the rate of height increase of individual splines is constant. An actuator coupled to the rocker paddle (the face) of the switch causes a cam to rotate in a clockwise direction and in a counter clockwise direction as the rocker paddle is alternately depressed. The rocker paddle pivots about its top edge and repeated pressing on the lower surface of the rocker paddle causes the actuator to alternately rotate the cam in a clockwise direction and in a counter-clockwise direction. Alternate rotation of the cam drives a slider member having a triangular shaped cam follower along a first and a second opposite direction along a common linear axis. A cam shaped leaf spring cooperates with the triangular shaped cam follower to aid in the movement of the slider and determines its at rest position. An indicator such as a light can be used to indicate the state of conduction of the switch.

25 Claims, 19 Drawing Sheets

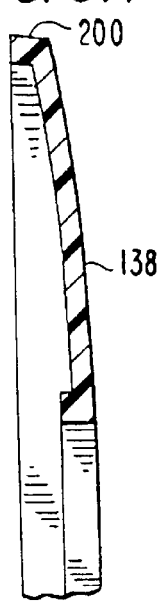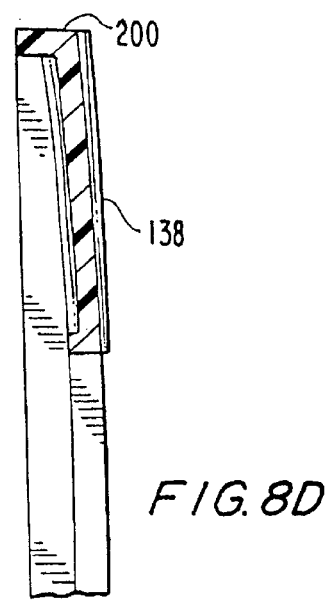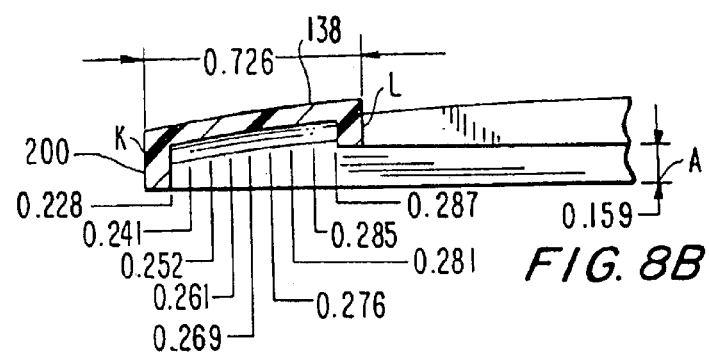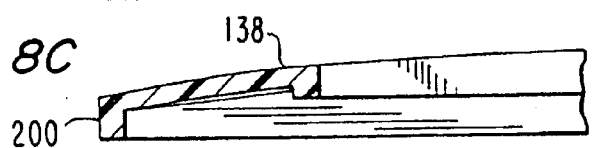

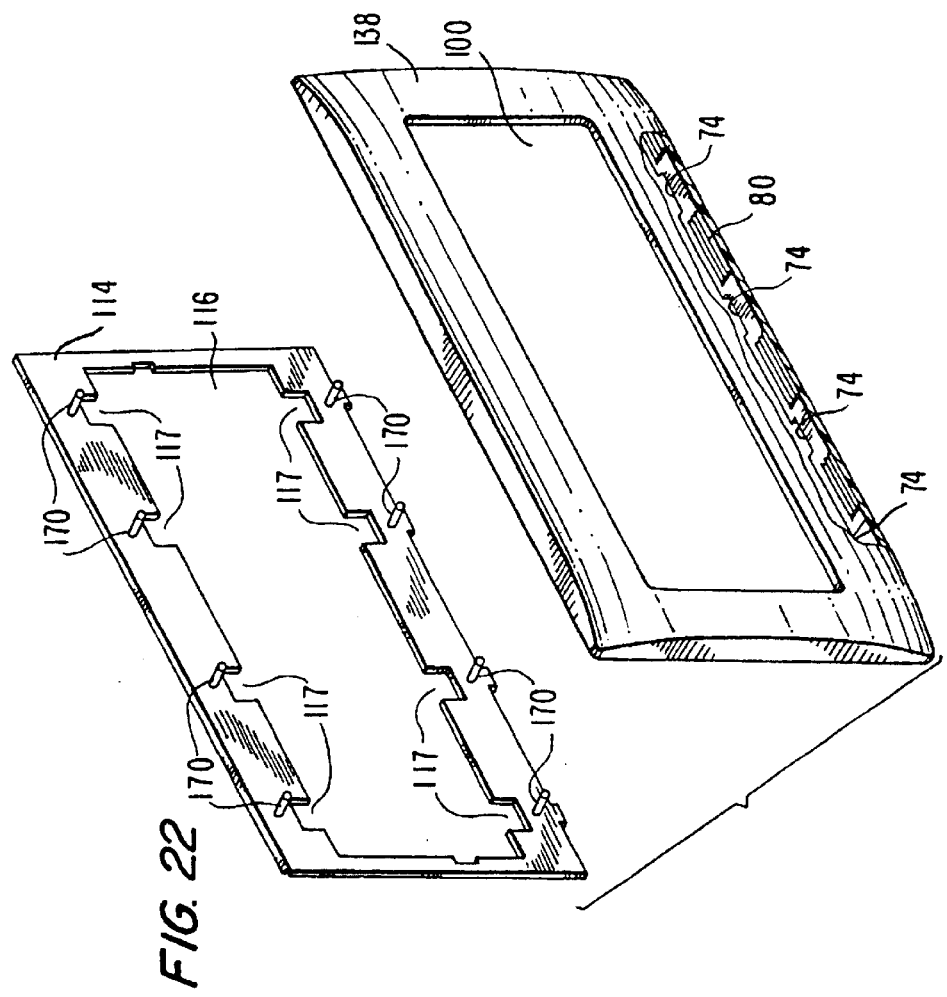

ROBUST ROCKER SWITCH MECHANISM

BACKGROUND OF THE INVENTION

1. Field of the Invention

The present invention relates generally to the field of electrical wiring devices such as, by way of example only, electrical switches and receptacles of the type installed in building walls, and more specifically to a robust electrical wiring device system whose components may be modular and interchangeable and which provide a substantially unified blended appearance when combined with one another. The present patent specification describes such a robust system and, in whole or in part, is common in part to several patent applications whose claims vary and/or are directed to portions and/or components of the robust system.

2. Description of the Related Art

When modifying the wiring in an existing building, whether public, commercial or residential by adding a wiring device such as a switch, a receptacle or a combination of a receptacle and a switch, it is necessary to cut a hole in a wall of the building, install a box within the hole, attach the box to a vertical stud, for example, and install the wiring device(s) into the box. In new construction, the box is attached to a stud of an open wall and, thereafter, the wall, which may be sheet rock having an opening for access to the box, is placed over the studs. The conventional wall box has pairs of mounting ears for mounting the wiring devices to the box. After the wiring devices are connected to the various conductors they will service, each is fastened with threaded fasteners (sometimes referred to as bolts or screws, and these terms are used interchangeably herein) to a pair of ears on the box. The process of connecting a wiring device to various conductors and then attaching the wiring device with the attached wires to the box is done for each wiring device located within the box. Thereafter, a wall plate is typically positioned around or over each of the wiring devices in the box.

Typical installations can include a single wiring device or multiple wiring devices positioned side by side in a common box. In installations where there are multiple wiring devices in a common box, the installation of the wall plate can be time consuming. This is so because a wall plate for use with multiple wiring devices has a separate window opening for each wiring device. Thus, the wiring devices must be aligned with each other, must be positioned parallel to each other and must be spaced from each other by a distance that is dictated by the spacing between the openings or windows in the wall plate. Misalignment and positioning problems are often caused by wall boxes that are skewed relative to the wall or by walls which may not be flat. It is only after all of the wiring devices are accurately positioned relative to each other that a wall plate can be installed around the wiring devices.

A common type of electrical wiring device in use today is the rocker type Decora-branded electrical switch whose activating member pivots about a centrally located horizontal axis. The trademark Decora is owned by the assignee of the present invention. To operate, the rocker switch actuating member is pushed in at the top to supply electricity to a load such as a light, and is pushed in at the bottom to disconnect the source of electricity from the load. Thus, with two or more rocker type of switches positioned side by side in a box, the actuating members of the switches can be in opposite positions at anyone time. For example, with two rocker type switches positioned side-by-side in a box, what will be called the top edge associated with the "on state or position" of the actuating member of one switch will be flush with the top surface of the wall plate when in its on position while, at the same time, the top edge of the adjacent switch will be flush with the bottom surface defining the opening of the wall plate when in its off position. This in-out positioning of adjacent switches can also occur when both switches are in their on or off state if one or each of the switches is a 3-way or 4-way switch. The irregular in-out positioning of adjacent switches, particularly with 3-way and 4-way switches, can create operational uncertainty in the mind of the user as to which switch is in the on position and which switch is in the off position when subsequent activation or deactivation of less than all of the rocker switches is required by a user.

Thus, what is needed is a rocker type of switch that is always in the same position i.e., bottom edge out, top edge in, regardless of its state of conduction, i.e., on or off. What is also needed is a switch which, when positioned side by side with another or other switches in a common box, that the switches are always aligned with each other regardless of whether they are in their on state or off state.

SUMMARY OF THE INVENTION

There is disclosed a robust on-off switch operated by pushing on the lower portion of a rocker paddle to turn the switch on or off. The lower edge of the rocker paddle pivots in and out about its top or upper edge. Bias means urges the lower portion of the rocker paddle to always be in its out position whether the switch is in the "on" state or position or the "off" state or position. The rocker paddle of the switch is not located within a frame and has, along its vertical axis, a contour of positive first differential and zero second differential, comprised of a combination of splines which extend between points of varying distances from a datum plane. The contour has zero second differential when the rate of height increase of individual splines is constant.

An actuator coupled to the rocker paddle (the face) of the switch causes a cam to rotate in a clockwise direction and in a counter clockwise direction as the rocker paddle is alternately depressed.

The rocker paddle pivots about its top edge and repeated pressing on the lower portion of the rocker paddle, the face plate, causes the actuator to alternately rotate the cam in a clockwise direction and in a counter-clockwise direction. Alternate rotation of the cam drives a slider member having a triangular shaped position determining cam follower along a first and a second opposite direction along a common linear axis. A cam shaped leaf spring cooperates with the triangular shaped cam follower to aid in the movement of the slider and determines its at rest position. An indicator such as a light can be used to indicate the state of conduction of the switch.

The foregoing has outlined, rather broadly, a preferred blending feature, for example, of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIGS. 8A–8D are sectional views along the lines 8A—8A to 8D—8D of FIG. 7.

DESCRIPTION OF A PREFERRED EMBODIMENT

Figure 1:
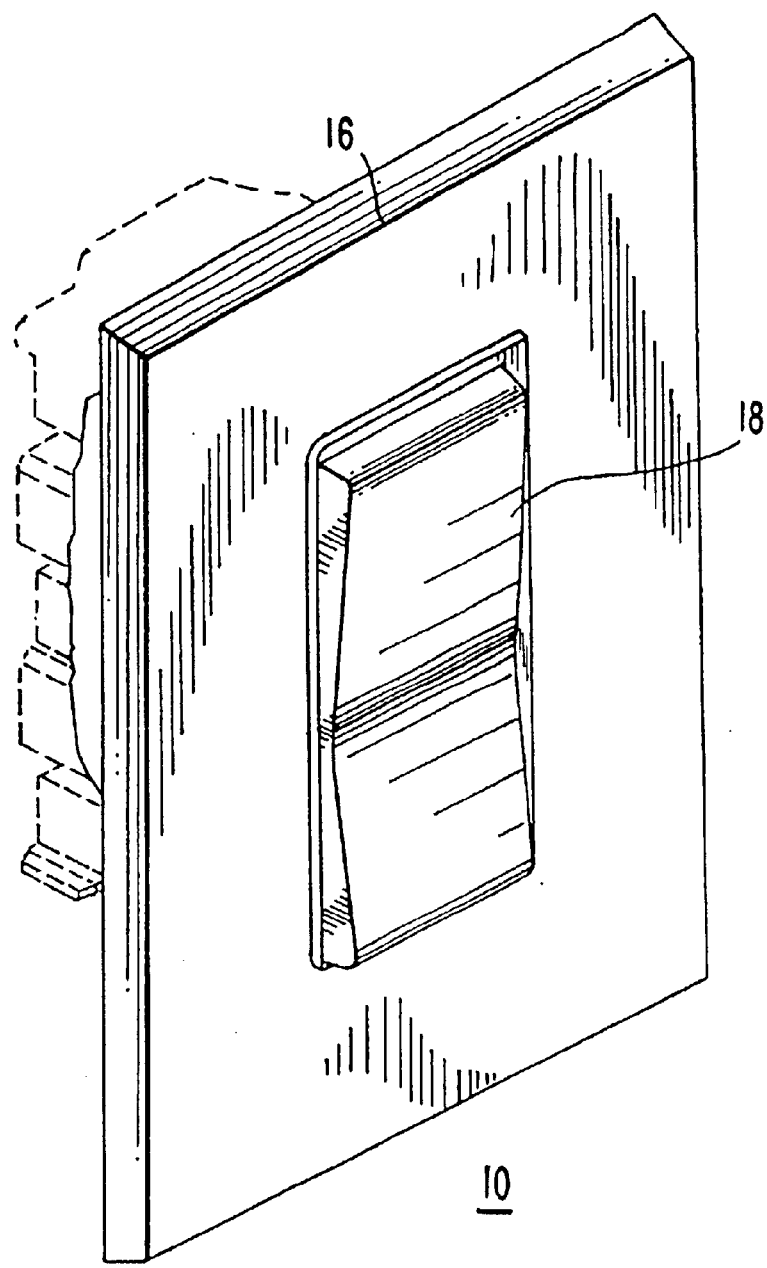
FIG. 1 is a front perspective view of a wall plate installed around a rocker switch of a prior art device.
Figure 2:
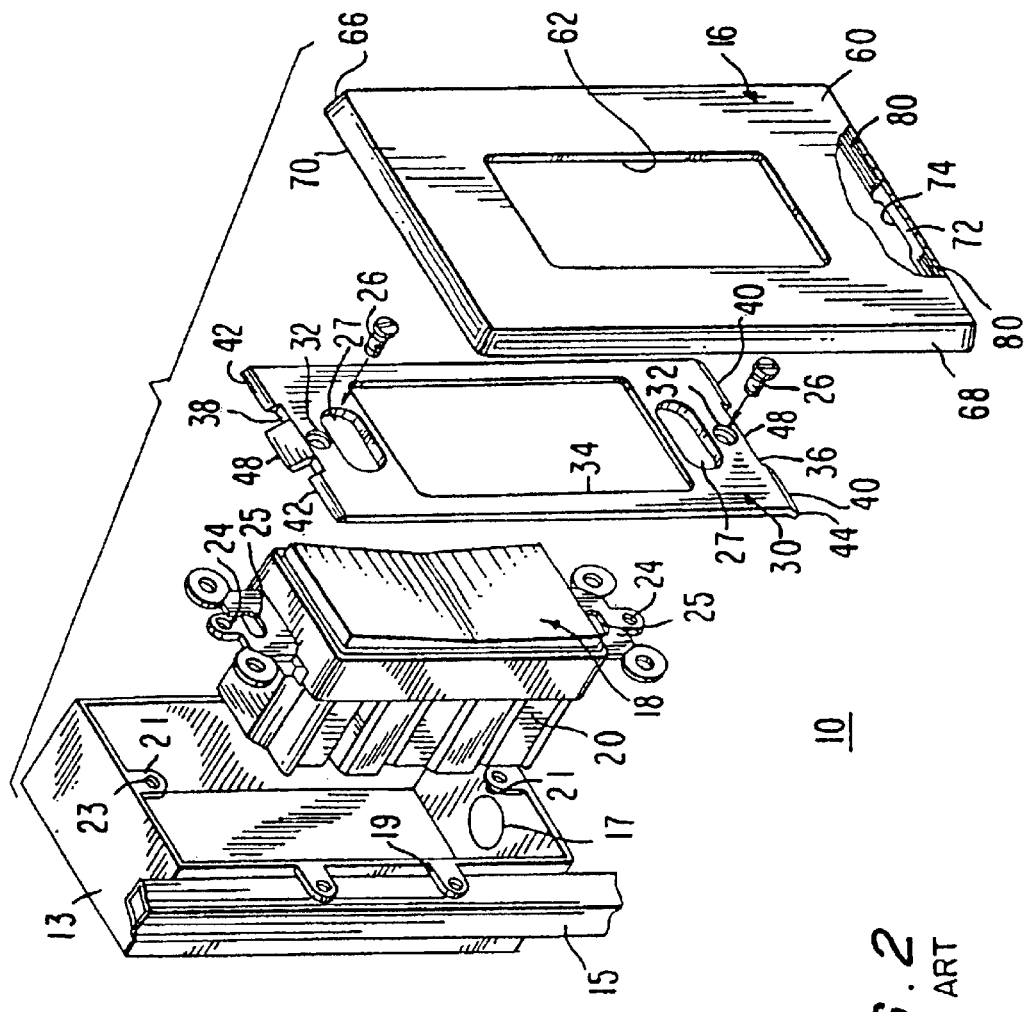
FIG. 2 is an exploded view of the switch, attachment plate and wall plate of the prior art device of FIG. 1.

Referring to FIG. 1, there is illustrated a front perspective view of a Decora electrical wall-type switch 18, a wall plate 16, as part of an assembly 10 of the prior art. Referring to FIG. 2, there is shown an exploded view of wall box 13, switch 18, attachment plate 30 and wall plate 16 of the prior art device of FIG. 1. A suitable aperture is cut into a wall to provide access for the box 13 mounted to a stud 15, or to permit installation of a suitable box to an adjacent stud or directly to the material of the wall (such as plasterboard). The box 13 is chosen to be large enough to accept as many wiring devices as are needed to be mounted therein. The box 13 is made of metal or plastic, depending upon local Code requirements and has one or more openings in its sides or back to permit the introduction of electrical wiring or cables into the interior of the box 13. Box 13 has mounting means 19 to permit the box to be anchored to the adjacent stud 15. The box supports a pair of mounting ears 21 for each wiring device that is to be mounted within the box. Each mounting ear contains a threaded aperture 23 to which can be fastened the threaded mounting bolts (sometimes referred to as screws) of the wiring device such as, for example, rocker switch 18 or a receptacle. In the normal order of assembly, electrical cables are passed through knock out openings 17, for example, to the interior of the box. The ends of the electrical cables are stripped of insulation and attached to terminals (contacts) on the side or rear of the body 20 of the switch 18 or a receptacle. After the electrical cables are attached to terminals on the side or rear of the body of the switch, the switch is pushed into the box and held in position by screws (not shown) that are passed through clearance openings such as elongated mounting slots 25 and threaded into openings 23 of ears 21 so as to mount switch 18 within and to the box 13. Thereafter, attachment plate 30 is positioned around the front of the switch and secured to the switch with mounting screws 26 which pass through clearance openings 32 in the attachment plate and are threaded into openings 24 formed in the mounting/ground strap of the wiring device. Attachment plate 30 also contains a main aperture 34 of a shape complimentary with the profile of the front of the switch 18 which extends through it. The aperture 34 in FIG. 2 is rectangular to accept the front of the switch 18. The head of the screw which passes through aperture 25 of switch 18 and engages threaded opening 23 of mounting ears 21 is larger than the aperture 25 and, therefore, holds switch 18 captive to the box 13 and to the wall surface (not shown). In a similar manner, the head of the screw which passes through aperture 32 of the attachment plate 30 and engages threaded opening 24 of the ground strap of the switch is larger than the aperture 32 and, therefore, holds attachment plate 30 captive to the switch 18.

At each of the ends 36, 38 respectively, of attachment plate 30 are two latching pawls 40, 42. Pawls or edges 40 and 42 are formed as extensions of attachment plate 30 but are thinner in cross-section. Each end 36, 38 also terminates in an angled leg 48 which extends at about a 45 degree angle with respect to the horizontal edge of ends 36, 38 of wall plate 30.

Wall plate 16 is proportioned to fit around attachment plate 30 and over the front of the box 13 into which the single wiring device, rocker switch 18, is placed and to which it is fastened.

To attach wall plate 16 to attachment plate 30, pawls 40, 42 of attachment plate 30 are made to engage saw-tooth shaped racks 80 on the inner surfaces of end walls 70 and 72 of wall plate 16 as the wall plate is pushed in.

Figure 3:
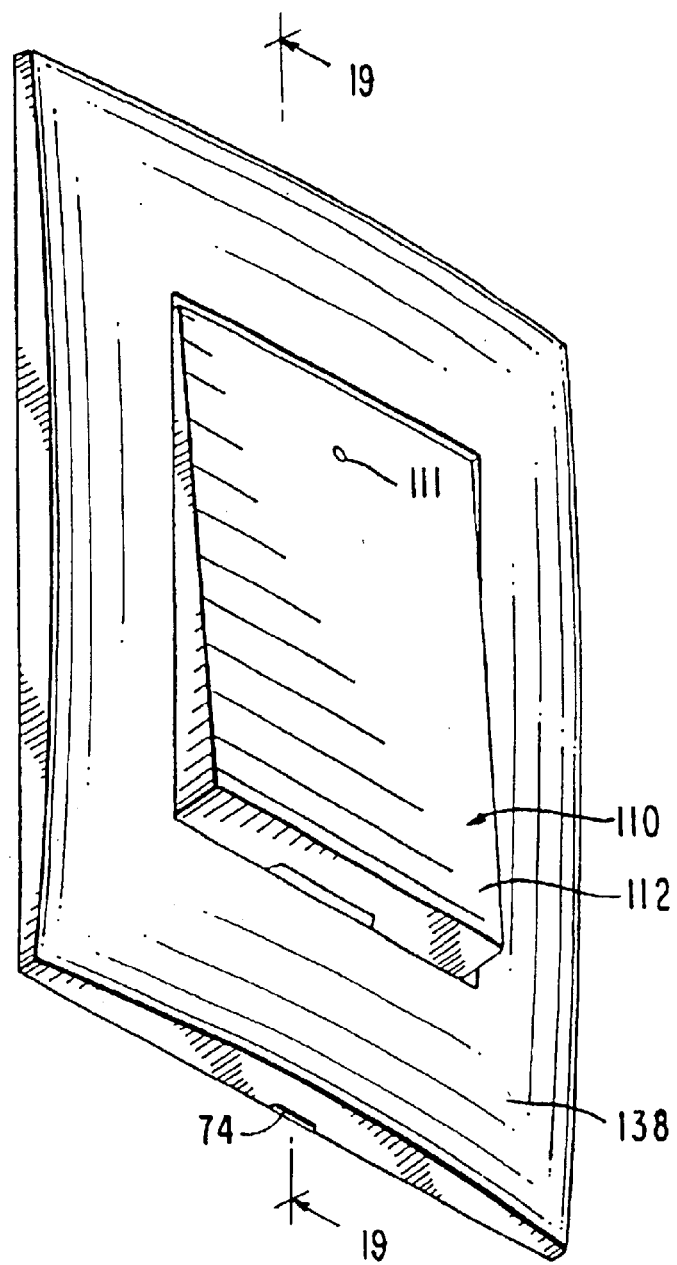
FIG. 3 is a front perspective view of a rocker paddle switch in accordance with the principles of the instant invention installed within a wall plate.
Figure 4:
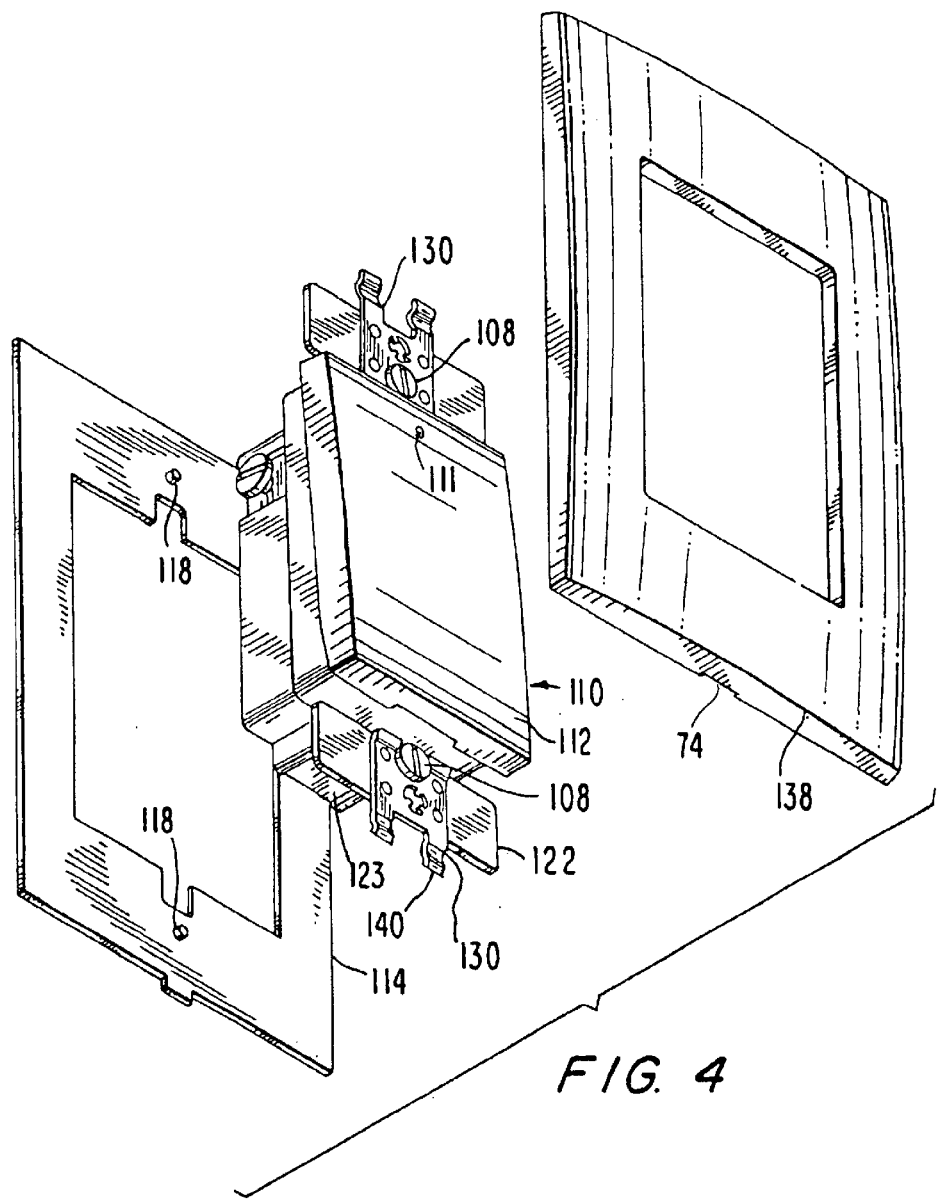
FIG. 4 is an exploded view of the rocker paddle switch, alignment plate and wall plate.

FIG. 3 is a front perspective view of a wiring device such as a rocker paddle switch 110 and wall plate 138 in accordance with the principles of the present invention. The switch can include a small window 111 behind which is located a light source to indicate the state of operation of the switch. Thus, the presence of light can indicate that the switch is "off", and the absence of light can indicate that the switch is "on". The switch is actuated, i.e., turned off and on, by pressing in on the lower end 112 of the face of the rocker paddle. Release of finger pressure on the paddle allows the paddle to return to its at rest "out" position. Repeated pressing and releasing of finger pressure on the lower end of the paddle alternately turns the switch "on" and "off". A slot 74 located in the bottom end of the wall plate 138 is provided to facilitate removal of the wall plate. FIG. 4 is an exploded view of the embodiment of the present invention illustrated in FIG. 3. FIG. 4 illustrates an alignment plate 114 (more fully disclosed in FIG. 5, and the description that relates thereto) having alignment pins 118 positioned to engage what is described in this specification as a multi-function clip 130 (more fully disclosed in FIG. 6 and the description that relates thereto) located on the ends 122 of the ground strap 123 of rocker paddle switch 110. The ground strap 123 can be of sheet metal and provides a cradle like support for holding the switch in a wall box. As shown in FIG. 2, (but not in FIG. 4) a box large enough to accept as many wiring devices as are needed is mounted in a wall. The box is made of metal or plastic, has one or more openings in its side or back to permit the introduction of cables into the interior of the box and has mounting means to permit the box to be anchored to an adjacent stud. Electrical cables are passed through knock out openings to the interior of the box and the ends of the electrical cables are stripped of insulation in preparation for attaching the cables to the switch. The box supports pairs of mounting ears. Each mounting ear contains a threaded aperture to receive a mounting screw of a wiring device such as, for example, rocker paddle switch 110. After the wires in the box are attached to terminals on the switch, the switch is attached to alignment plate 114 by multi-function clips 130 which engage alignment pins 118 on the alignment plate 114, and the switch and alignment plate are then coupled to the box and wall surface by means of screws 108. Thereafter, wall plate 138 is placed around the switch, the alignment plate 114 and the box assembly and held in place by outwardly extending edges 140 or pawls at the ends of the multi-function clips which, in turn, engage saw tooth racks on the wall plate 138 as described in detail below.

The rocker paddle switch 110 of the present invention can be implemented in a number of preferred embodiments, including single-pole, single-throw; single-pole, double-throw; double-pole, single-throw; and double-pole, double throw for 3 wire or 4 wire circuit arrangements.

Figure 5:
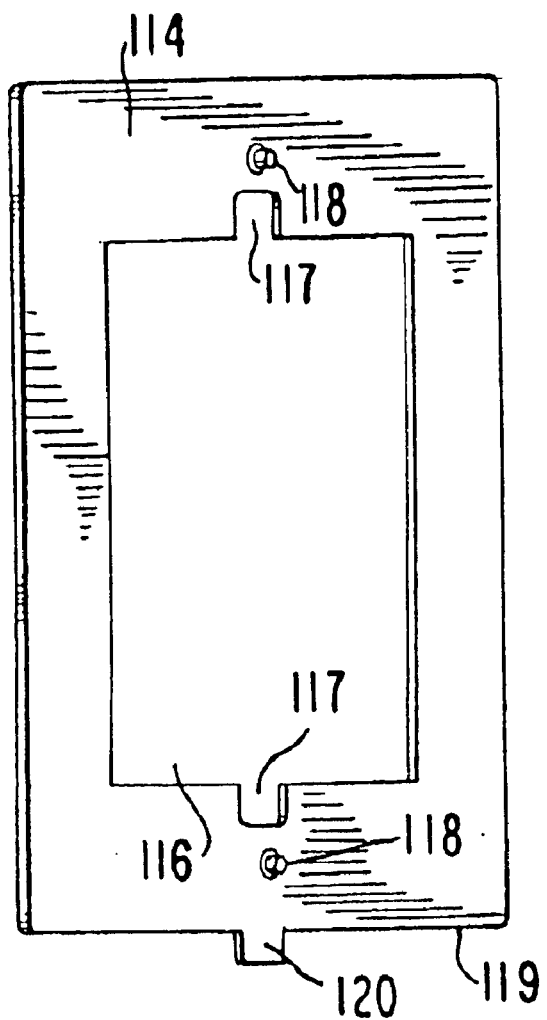
FIG. 5 is a front perspective view of the alignment plate for a single wiring device.

Referring to FIG. 5, there is shown a perspective view of the alignment plate 114 of FIG. 4. Alignment plate 114, which can be composed of metal such as cold rolled steel or the like, is formed with a centrally located opening 116 sized to accept the body of a wiring device such as switch 110 or a receptacle. Centrally located at opposite ends of the opening 116 and contiguous with the opening 116 are two clearance openings 117 which provide clearance for mounting screws 108 used to secure the switch 110 or a receptacle and alignment plate 114 to box 13. Located beyond the outer edge of each clearance opening 117 is an alignment pin 118. The alignment pins are used to engage openings (134 of FIG. 6) in multi-function clips 130 attached to the ends 122 of the ground strap 123 of the rocker paddle switch or a receptacle. Alignment plate 114 supports a tab 120 that projects outward from an end 119 (typically the lower end when on a wall) and is used to facilitate removal of a wall plate from around the face of a switch or receptacle. The outside dimensions of the alignment plate are such that it can extend beyond at least one dimension of the box in which the switch is installed and has length and width dimensions which are less than the wall plate to which it is attached. The alignment plate illustrated in FIG. 5 is formed or configured for a single wiring device.

The alignment plate 114 helps to overcome difficulties encountered with respect to mounting and positioning wiring devices such as multiple switches, a switch and a receptacle, or multiple receptacles to a box prior to attaching a wall plate. Some of the difficulties encountered are positioning the wiring devices to be in alignment with each other, positioning the wiring devices to be parallel to each other, adjusting the spacing between the devices to be equal and uniform and positioning all of the devices to be flat against the wall. These deficiencies are overcome by the alignment plate 114 which has a single opening 116 with no separating members, is sized to receive one or more wiring devices, has a pair of alignment pins 118 for receiving, holding and accurately positioning each wiring device, contains clearance openings 117 aligned with each set of alignment pins 118 for receiving mounting screws and supports at least one tab 120 which can be used when it is desired to remove the wall plate from the wiring device. Each set of alignment pins on the alignment plate is located on a vertical axis which substantially defines the center for a wiring device and each wiring device has a multi-function clip 130 at each end of the ground strap 123 for frictionally receiving and holding captive an alignment pin 118. The alignment pins 118 accurately position, align and locate all of the wiring devices relative to each other. The alignment plate is attached to the wiring device and the assemblage is attached to a wall box by means of mounting screws. Thereafter during the installation process, a wall plate 138 is positioned around the wiring devices without requiring further adjustments, and the wall plate is attached by simply pressing the wall plate in toward the wall.

Figure 6:
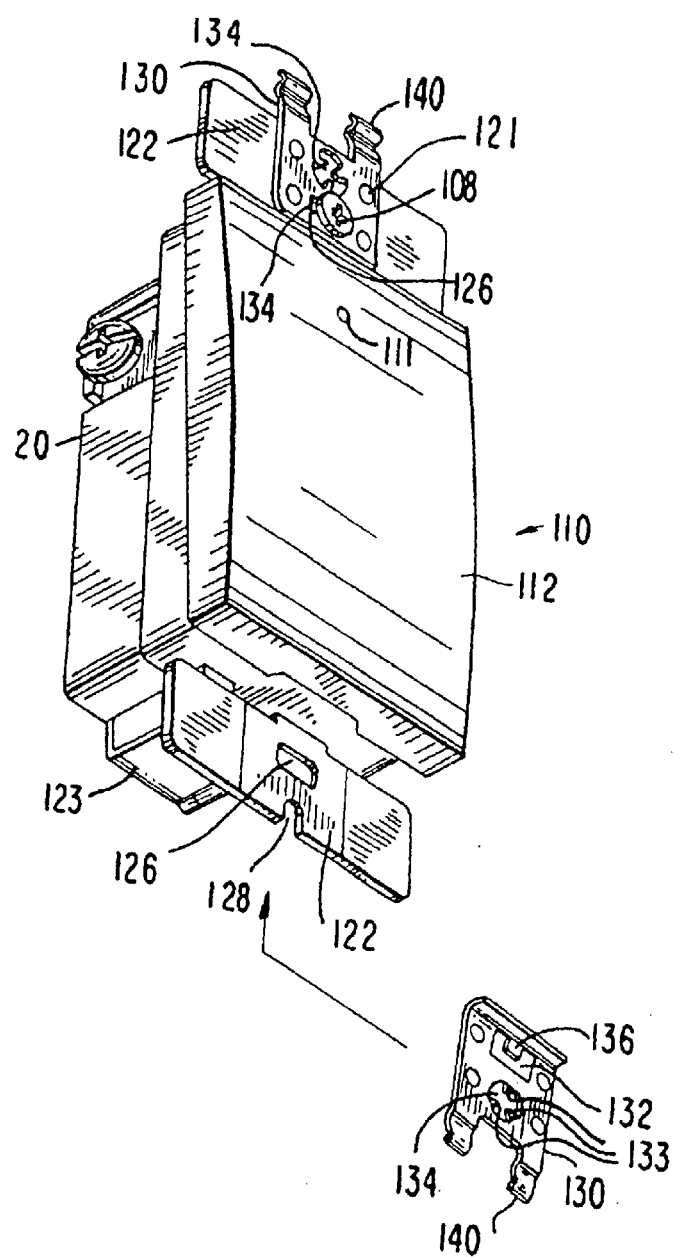
FIG. 6 is a front perspective view of the rocker paddle switch of FIG. 3 and an exploded view of a multi-function clip attached to each end of the ground strap of the rocker paddle switch.

Referring to FIG. 6, there is illustrated an electrical wall-type rocker paddle switch 110 around which the wall plate 138 can be positioned. The switch 110 has a rocker paddle 112 that pivots about an axis at its upper end and is biased by a spring member located beneath the paddle to assume the same at-rest out position when either in its on position or off position. Repeated pressing and releasing on the face of the switch rocker paddle 112 alternately closes and opens a set of contacts within the switch to alternately connect and disconnect a load such as a light from a source of electricity each time the paddle is pressed and released. Thus, regardless of whether adjacent switches are on-off switches, 3-way switches or 4-way switches, the top and bottom edges of all of the switches will always be aligned with each other. An on-off indicator such as a light 111, or a flag, mechanical protrusion of the like can be provided to indicate to a user when the switch is in its on position or off position. The rocker paddle of the switch is frameless, it is not located within a frame, and has a face surface which follows or blends with the contour and shape of the wall plate, thereby presenting a substantially unified and aesthetically pleasing appearance. However, because there is no frame, care must be exercised to ensure that the sides of the rocker paddle do not touch, bind or interfere with the wall plate. The rocker paddle of the switch has a length-width ratio dimension that is proportioned to provide a finger contact surface of increased area to allow a user to more easily and quickly identify and operate a specific switch.

Switch 110 (FIG. 6) contains a mounting/ground strap 123 having ends 122 which provide support for multi-function clips 130 by means of fasteners 121 such as screws, rivets, spot welds or the like. Each end 122 can be rectangular in shape and supports two openings 126 and 128. Opening 126 can be oval, square or rectangular in shape and is a clearance opening for mounting screws 108 which may be provided by the manufacturer of the wiring device for attaching the wiring device to the box. The distance between centers of openings 126 of ends 122 on the ground strap 123 is substantially equal to the distance between the centers of openings 23 in ears 21 of box 13 (see FIG. 2) to allow mounting screws 108 in openings 126 to engage and be held captive by the threaded openings 23. It is to be noted that clearance openings 117 in alignment plate 114 (see FIG. 5) are clearance openings for mounting screws 108. Openings 128 in the lugs 122 are clearance openings for alignment pins 118 of alignment plate 114.

Figure 10:
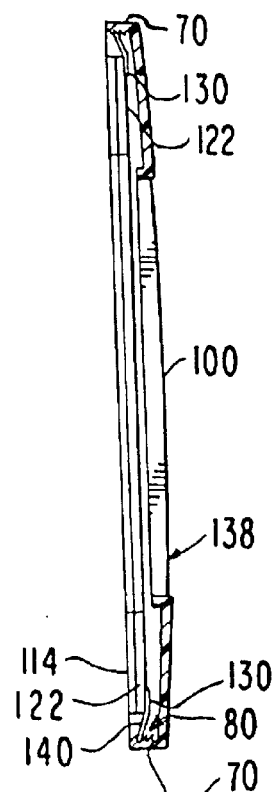
FIG. 10 is a side sectional view of the wall plate of FIG. 7 being held in place by the latching pawls of multi-function clips.

Continuing with FIG. 6, multi-function clips 130 can be composed of, for example, phosphor bronze, spring brass, spring steel or the like and are securely attached to the ends 122 of the ground strap 123 of switch 110. Each clip 130 contains a first opening 132 which is aligned during assembly with opening 126 in strap end 122 and a second opening 134 which is aligned during assembly with opening 128 in the strap end. Opening 132 can be oval or rectangular in shape to allow a mounting screw to be positioned off-center. A substantially centrally aligned projection 136 bent at a slight downward angle toward the body of the switch is provided to engage and hold captive the threaded body of mounting screw 108. Engagement of projection 136 with the mounting screw 108 additionally provides a good electrical connection between the ground strap 123 of the switch 110, the mounting screw and the box to insure that the switch is electrically connected to ground. The screw which passes through openings 132 and 126 of the switch and opening 117 of the alignment plate 114, threads into opening 23 in the box to hold the switch and alignment plate to the box. The openings 132 and 126 are sized to allow the screw to be moved laterally to compensate for slight misalignments that may occur. Opening 134 in multi-function clip 130 is substantially circular and supports three inwardly projecting members 133 bent outward at a slight angle away from the switch body. The ends of the three projecting members 133 form an opening slightly smaller than the outer diameter of alignment pins 118 on alignment plate 114 and are designed to resiliently flex slightly as the alignment pin is inserted into and through opening 134 from the rear. The ends of projecting members 133 frictionally engage and hold captive alignment pins 118 to prevent the easy removal of the alignment pins from the multi-function clips. Located at the end of clip 130 are two tabs 140 which function to engage and hold a wall plate. The end of each tab 140 has a double bend similar to a zero to 360 degree sine wave curve which engage saw tooth racks 80 on the inside ends of the wall plate to hold the wall plate captive (See FIGS. 10 and 11, and the description which relates thereto). It should be clear by now and from the further description below that multi-function clip 130 is just that, a device which substantially simultaneously serves a plurality of functions in a manner unknown to the prior art.

The multi-function clip overcomes the difficulties encountered with respect to mounting one or more electrical wiring devices to a common box and then accurately positioning the wiring devices relative to each other prior to attaching a wall plate. Some of the difficulties encountered when attaching a wall plate around wiring devices are, by way of example: positioning the wiring devices to be in alignment with each other, locating the wiring devices to be parallel to each other, adjusting the spacing between the different wiring devices to be equal, uniform and non-interfering, and fixing all of the wiring devices to be flat against the wall. Each wiring device according to the present invention has at an end of the ground strap 123 a multi-function clip 130 that has locating openings 134 for engaging alignment pins 118 on the alignment plate 114. The pins 118 on the alignment plate, when engaged by the close clearance locating openings in the multi-function clips, accurately positions the wiring devices relative to each other to allow a wall plate to be attached around the wiring devices without any initial or subsequent adjustment being needed. Each set or pair of alignment pins 118 on the alignment plate are located on a substantially vertical axis which accurately defines the center of the wiring device, although other alignments can also be provided. The openings 134 in a pair of multi-function clips receive and hold captive a pair of cooperating alignment pins 118. The multi-function clips, in cooperative combination with the alignment pins, serve to accurately position and align all of the wiring devices mounted on the attachment plate. After the wiring device(s) are attached to the alignment plate, the attachment plate and attached wiring devices are attached to a wall box by means of mounting screws which pass through openings 132 of the multi-function clips and opening 117 of attachment plate 114 to provide a substantially flat rigid support for the wiring devices.

During assembly, the electrical cables in the box are stripped of insulation and are attached to terminals on the side or back of the switch. After the wires are attached to the switch, the alignment plate is held vertically in front of the switch and parallel to the switch. The top of the switch is now rotated what will be called downward from its vertical position, until it is horizontal and, while in its horizontal position, the end of the switch that was initially up is passed through opening 116 of the alignment plate which is in its vertical position. After the switch is passed completely through the opening of the alignment plate, the switch is rotated back to its initial vertical position. At this time the alignment plate is positioned around the electrical wires and is located behind the switch. The distance between the alignment plate and the switch is now reduced until the front face of the alignment plate contacts the back face of the ends of the ground strap. As the alignment plate is moved toward the wiring devices, or vice versa, the alignment pins 118 of the alignment plate enter openings 128 in the strap 123 and openings 134 in multi-function clips 130. As the alignment pins enter openings 134, they force the upwardly bent projections 133 to resiliently move and spread apart to allow the alignment pins 118 to fully enter openings 134. The ends of the upwardly bent projections 133 engage and hold captive the alignment pins 118. The switch which is now attached to the alignment plate and is connected to the electrical wires, is inserted into the box. As the switch is being inserted into the box, screws 108 located in openings 132 in the multi-function clips and clearance openings 117 in alignment plate 114 are aligned with and threaded into openings 23 of the box to hold both the alignment plate and switch to the box and wall surface. The head of the screw which passes through opening 126 of the end of the mounting strap of the switch and opening 132 in the clip is larger than either opening and, therefore, holds switch 110 and alignment plate 114.

The wall plate is now placed over the installed switch. It is to be noted (see FIGS. 3, 4 and 6) that the rocker paddle 112 of the switch 110 is not located within a frame. Thus, the switch must be accurately positioned to insure that the rocker paddle is free to move in and out without contacting or interfering with an adjacently positioned wiring device or the wall plate. Each multi-function clip 130 contains at least two projecting latching pawls 140. See FIG. 6. Each latching pawl has a double curve similar to a three hundred sixty degree sine wave-type curve. After the switch is attached to the alignment plate, the two latching pawls 140 of a multi-function clip will be located on either side of tab 120 of the alignment plate. Tab 120 functions as a tool pivot point to allow the wall plate 138 to be removed from around the switch. A slot 74 in the lower edge of the wall plate 138 provides access for the insertion of a small flat tool such as a screw driver to facilitate removal of the wall plate from the switch.

Wall plate 138 is proportioned to fit over alignment plate 114 as well as the box within which the switch 110 is located. The wall plate 138 is located around the switch and held in position by pawls 140 which engage saw tooth shaped teeth on an inside edge of the wall plate.

Referring to FIGS. 7–12, for a single wiring device, the width of the face of the rocker paddle switch, is approximately 55% of the width of the wall plate along the horizontal axis and approximately 56% of the length of the wall plate along the vertical axis. The face of the switch has a vertical axis along its length and a horizontal axis along its width where the face of the rocker paddle along its vertical axis has a contour of positive first differential comprised of a combination of splines drawn between points of varying distances from a datum plane and zero second differential when the rate of height increase of the individual splines is constant. The horizontal axis has a surface with a contour of a positive first differential and negative second differential comprised of a combination of splines drawn between points of varying distance from a datum plane. For a single wiring device, the wall plate is substantially more or less 4.92 inches in length by 3.28 inches in width and has a single opening 100 with no dividing members encircling a wiring device, such as a rocker paddle switch that is substantially more or less 2.82 inches in length by 1.83 inches in width. The width of the wall plate varies depending upon how many boxes are ganged together and the number of wiring devices that are to be located in side-by-side relationship. The front surface of the wall plate here disclosed has a complex or compound contoured shape such that the face surface at the opening for the wiring device is further from the wall than it is at the outer edge of the wall plate. More specifically, referring to FIG. 8B, there is illustrated a view along the line 8B—8B of FIG. 7 of a portion of the front surface, along the horizontal centerline, between point K, the outer left edge, and point L, the inner edge of the opening for the wiring device. As illustrated in FIG. 8B, the surface lies between two profile boundaries 0.002 inches apart, perpendicular to datum plane A, equally disposed about the true profile and positioned with respect to a datum plane. The basic dimensions and the profile tolerance establish a tolerance zone to control the shape and size of the surface. The surface is more or less 0.726 inches in length. Within that length, a contour is defined by the dimensions of equidistant points which are 0.0726 inches apart. Each dimension indicates that point's distance to datum plane A, the back (flat) surface of the wall plate, which begins at point K. Moving from left to right, the dimensions increase more or less from 0.228 to 0.287 inches. This progression indicates a shape or contour of increasing height, positive first differential, when the points are connected by individual splines. The points are not connected by a single arc and the rate at which the contour height increases is not constant. The rate of height increase of the individual splines decreases from left to right, and the second differential of the contour is negative. That is, the difference between the first point's distance dimension and the second is larger than the difference between the second and the third, etc. Thus, the surface has a contour of positive first differential and negative second differential, comprised of a combination of splines drawn between points of varying distance from a datum plane. This description substantially describes the wall plate's contours for sections along lines 8A—8A, 8C—8C, and 8D—8D of FIG. 7.

Figure 7:
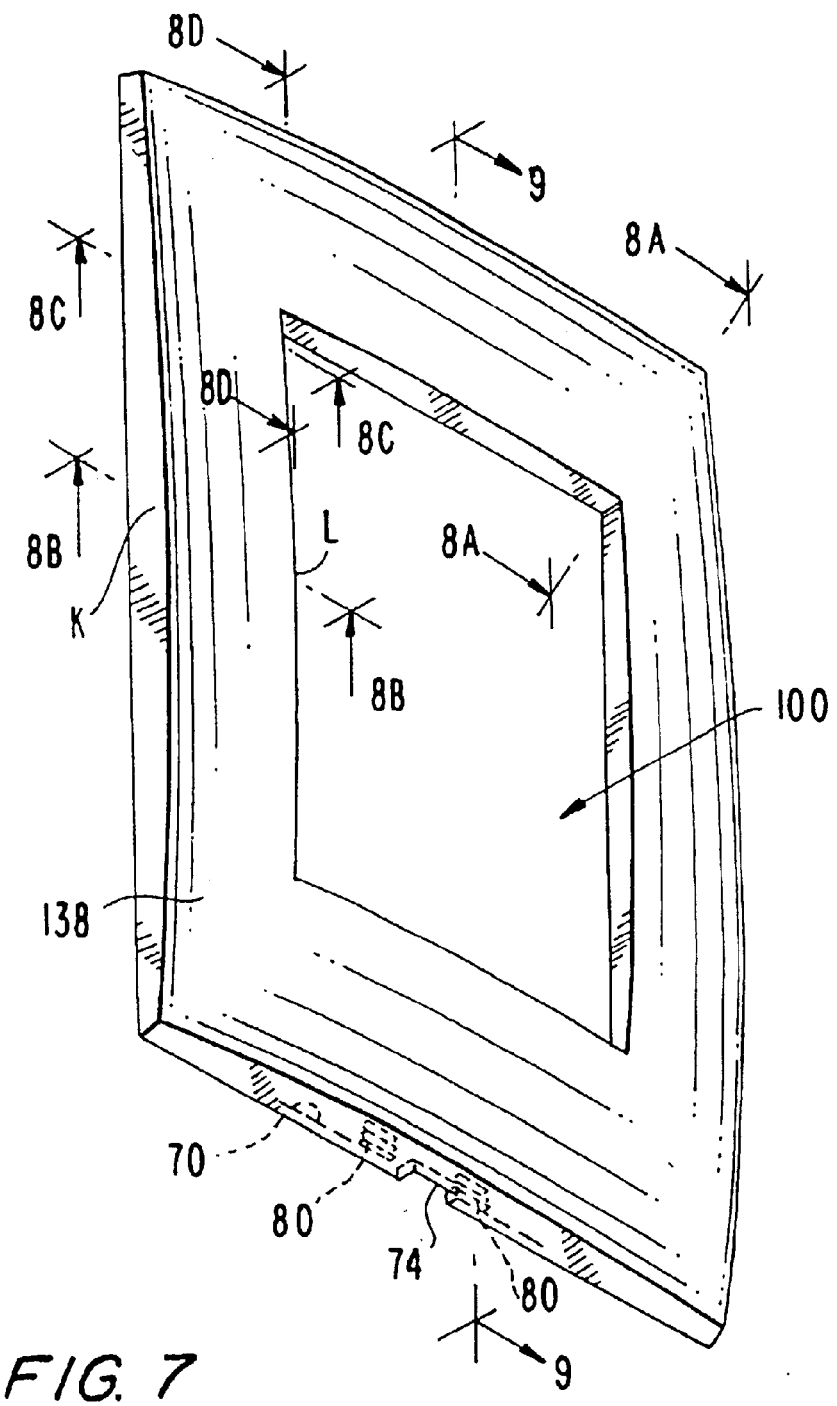
FIG. 7 is a front perspective view of the wall plate.
Figure 9:
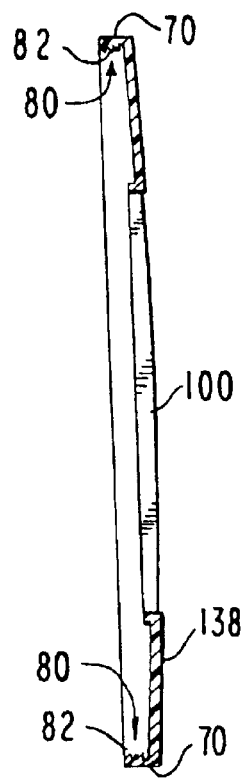
FIG. 9 is a view along the line 9—9 of FIG. 7.

FIG. 8A is a section along the line 8A—8A of FIG. 7; FIG. 8B is a section along the line 8B—8B of FIG. 7; FIG. 8C is a section along the line 8C—8C of FIG. 7; and, FIG. 8D is a section along the line 8D—8D of FIG. 7.

The section along line 9—9, which runs along the vertical centerline of the wall plate defines a surface having a positive first differential and zero second differential, comprised of a combination of splines drawn between points of varying distance from a datum plane. This contour has zero second differential because the rate of height increase of the individual splines is constant; the difference between any two sequential point dimensions is substantially more or less 0.0037 inches.

When the wiring device used according to the system of the present invention is a switch, the front surface follows the contours, and shape of the wall plate, so that their surface contours or lack thereof blend with one another to provide a substantially unified aesthetic appearance to the viewer thereof. The wall plate has no exposed mounting screws or other visible metal hardware. When the wall plate is attached to the switch, the only visible parts are the wall plate 138 and the switch or receptacle.

Figure 11:
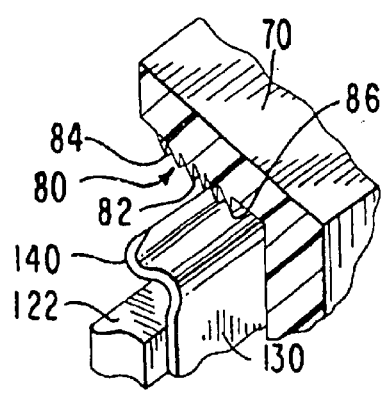
FIG. 11 is a fragmentary enlarged side elevation of the latching pawl of the multi-function clip engaging the sawtooth rack of the wall plate.
Figure 12:
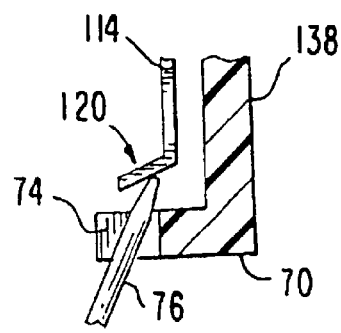
FIG. 12 is a fragmentary, enlarged side elevation in section of the wall plate and tab of the alignment plate to indicate how the two components can be separated following latching.

Referring to FIGS. 9–12, formed in the bottom end wall 70 of wall plate 138 is a slot 74 which provides access to the tab 120 as is seen in FIG. 12. A small, flat tool blade such as a screw driver blade 76, or the like, is moved through slot 74 in end wall 70 to contact both the outer surface of tab 120 and the back wall of slot 74. By moving the blade 76 using the back wall of slot 74 as a fulcrum, the force applied to tab 120 will separate wall plate 138 from the switch. To attach wall plate 138 to the switch, the pawls 140 of clips 130 are positioned to engage saw-tooth shaped racks 80 located on the inner surfaces of the end walls 70 of wall plate 138. There are two racks on each end wall 70 of the wall plate 138. Each rack 80 contains a number of saw-tooth shaped teeth 82 each having an inclined front face 84 and a vertical back face 86. As seen in FIG. 11, as latching pawl 140 engages the inclined front face 84 of a tooth, the pawl deflects and moves past the tip of the first tooth 82. Once pawl 140 is past the tip of tooth 82, it can return to its initial position and take a position between the vertical back face 86 of first tooth 82 and the inclined front face 84 of a second tooth 82. This operation can be repeated as many times as needed to position the bottom edges of wall plate 138 as close to the wall as possible. As racks 80 and pawls 140 are independently operated, it is possible to locate the wall plate 138 to closely follow the wall contour, even when the wall is not flat. This ability to follow the wall contour is even more appreciated where the wall plate 138 is large, such as with a wall plate that is positioned around a multitude of wiring device.

Once the latching pawl 140 returns to its original position, it becomes difficult to dislodge the wall plate 16 from the pawl 140. However, as tool 76 can apply a great deal of force to tab 120, it is possible to separate the pawl 140 from engagement with the teeth and thus the wiring device from the wall plate.

Figure 13:
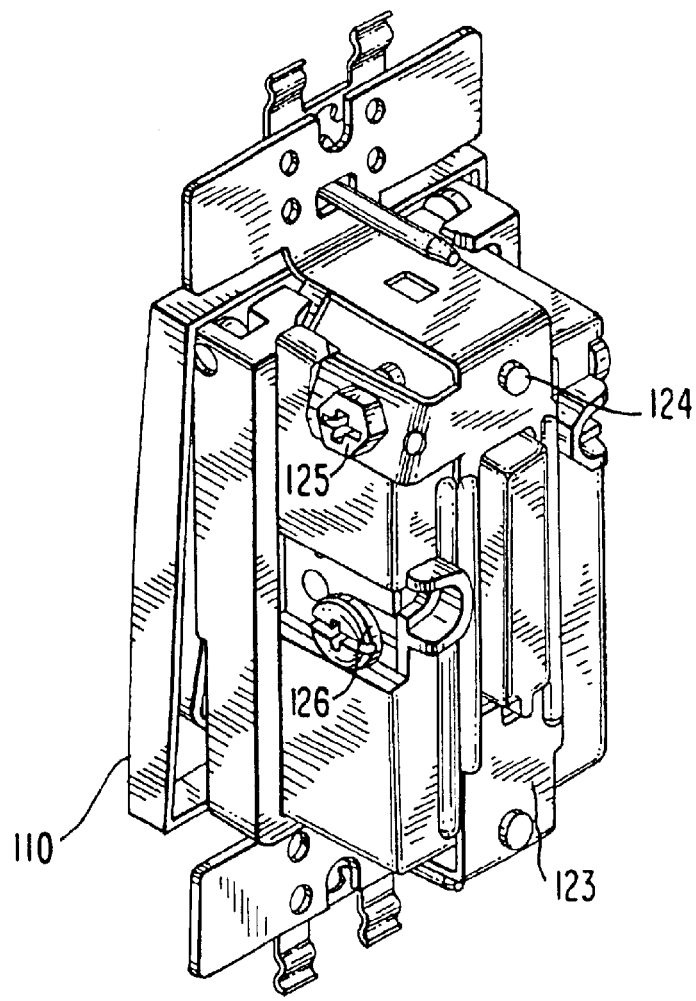
FIG. 13 is a bottom perspective view of the rocker paddle switch.

Referring to FIG. 13, there is shown an isometric of the bottom of a rocker paddle switch in accordance with the principles of the invention. The switch supports a ground strap 123 of sheet metal secured to the switch with screws, rivets or any convenient fastening means 124 and supports a ground terminal screw 125 for receiving a ground wire connection. Screw terminals located on either side of the body or the switch are provided to receive phase and neutral wire conductors, not shown.

Figure 14:
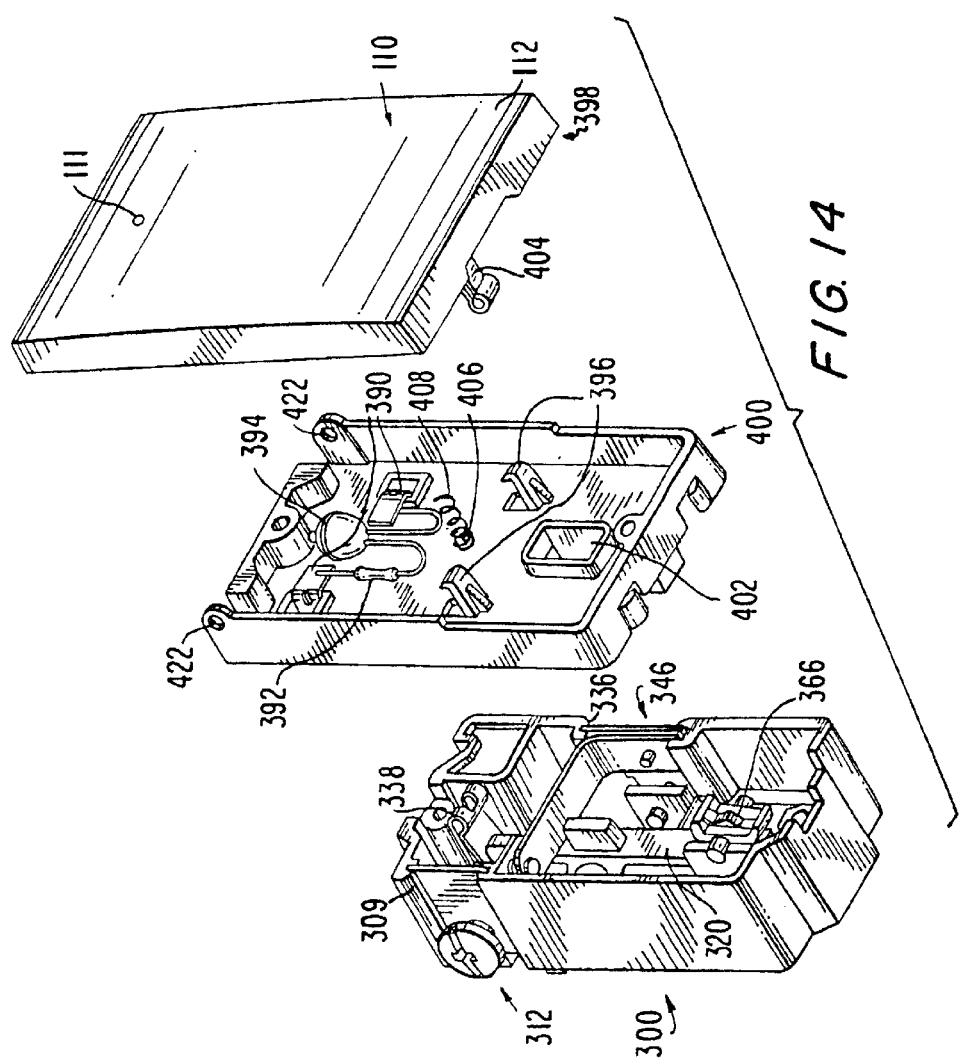
FIG. 14 is an exploded view of a single pole rocker paddle switch.
Figure 15:
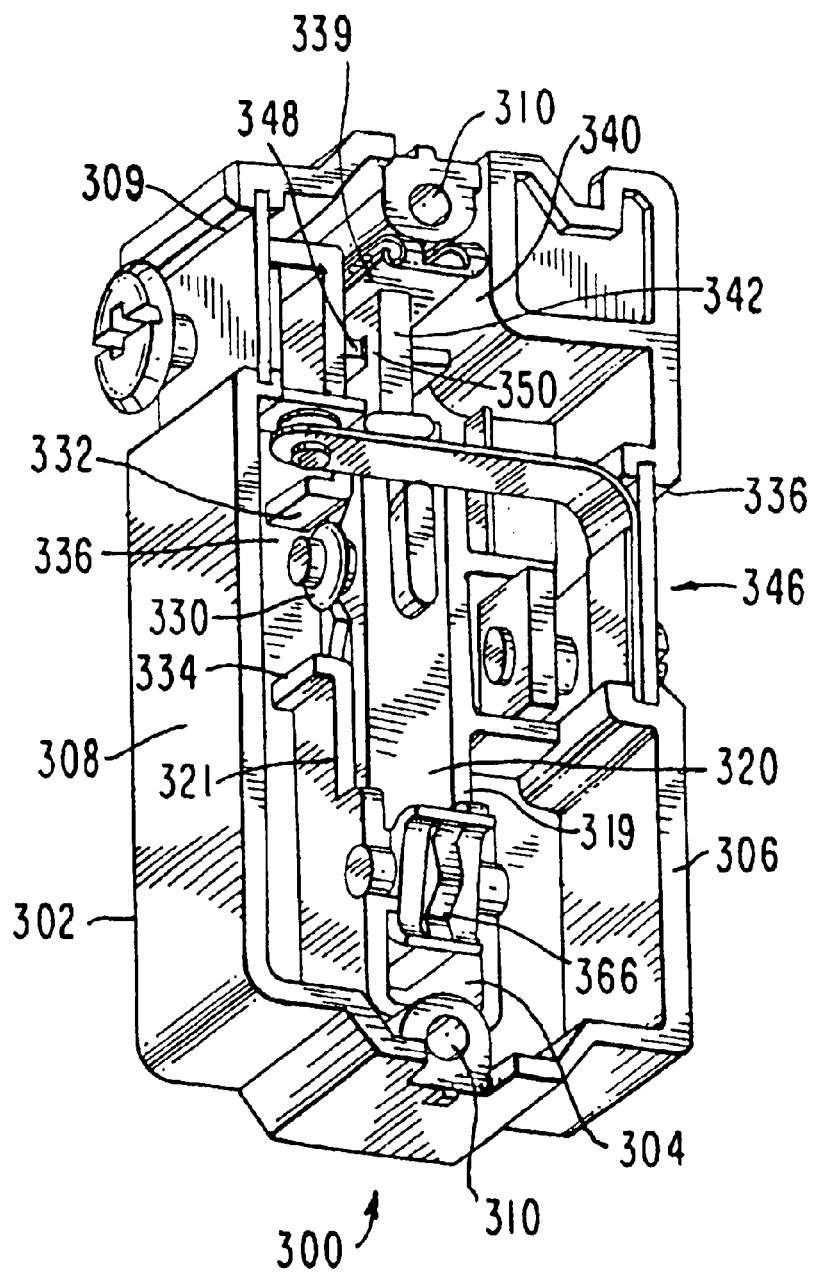
FIG. 15 is a perspective of the single pole rocker paddle switch base assembly.
Figure 18:
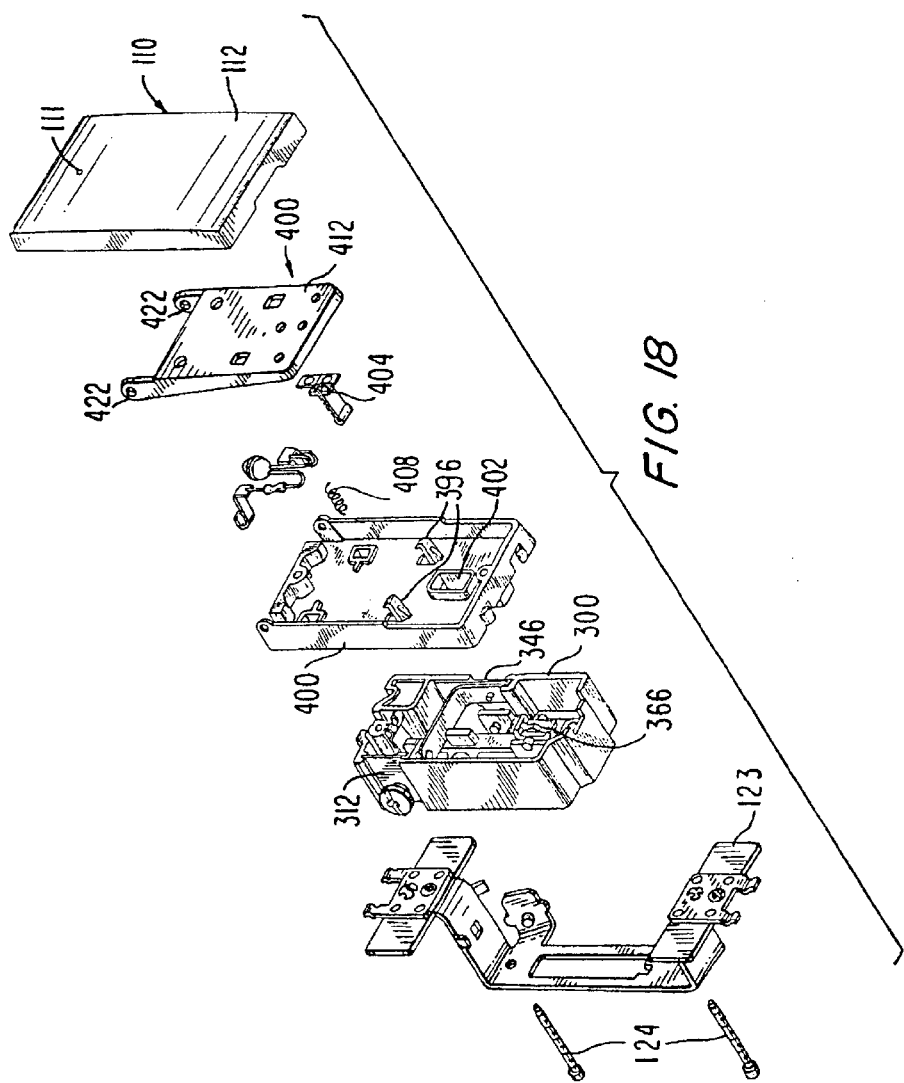
FIG. 18 is still another exploded view of the single pole rocker paddle switch.

FIG. 14 is an exploded view of a single pole rocker paddle switch showing the base assembly 300 and frame assembly 400 which, when joined together form the switch housing. The rocker paddle 112 is the top portion of the switch. Referring to FIG. 15, there is shown an enlarged view of the base assembly 300. Base assembly 300 consists of shell member 302 composed of electrically insulating material having a channel 304 which extends substantially along the length of member 302 and is centrally located between the side walls 306, 308 of member 302. Channel 304 is adapted to receive a slider 320. Located at each end of channel 304 is a clearance opening 310 adapted to receive fastening means 124 (see FIGS. 13, 18 and 19). The fastening means can be rivets, screws or the like and pass through and lock the ground strap 123, base assembly 300 and frame assembly 400 together to form the switch housing. Side wall 308 of the shell member supports an opening 309 for receiving a stationary terminal assembly 312 and side wall 306 supports an opening 336 for receiving brush terminal assembly 346 more fully disclosed in FIG. 16.

Stationary terminal 312 comprises a rectangular plate 313 which can be composed of brass and supports a substantially nonyielding contact bearing arm 314 having a contact 316. An inverted U shaped slot 318 located in rectangular plate 313 is sized to loosely receive terminal screw 320 and be sandwiched between terminal screw 320 and a pressure plate 323. Terminal screw 320 threads into pressure plate 323 and, as terminal screw 320 is tightened, the head of the screw 320 and a side of the pressure plate 323 clamp the rectangular plate 313 therebetween. Stationary terminal assembly 312 is adapted to be connected to an electrical conductor by either placing a turn of the conductor under the head of the screw or inserting a straight end of the conductor between the pressure plate 323 and the rectangular plate 313 and tightening the screw 320 to lock the conductor between the plates 313 and 323. Looking at side wall 308 of shell member 302, each of the two edges 311 of opening 309 contain a narrow vertical slot or rail 315 of uneven length adapted to receive and hold the side edges of the rectangular plate 313. Thus, by sliding the rectangular plate 313 of the stationary terminal assembly 312 down into the slots or rails 315 in the edges of the opening 309, the stationary terminal assembly is held in position within the opening 309 of the side wall 308 of the shell member 302.

Brush terminal assembly 346 comprises a rectangular plate 380 which can be composed of brass and supports a yieldable contact bearing arm 344 having a contact 317. An inverted U shaped slot 381 located in rectangular plate 380 is sized to loosely receive terminal screw 386 and be sandwiched between terminal screw 386 and a pressure plate 388. Terminal screw 386 threads into pressure plate 388 and, as terminal screw 386 is tightened, the head of the screw 386 and a side of the pressure plate 388 clamp the rectangular plate 380 therebetween. Brush terminal assembly 346 is adapted to be connected to an electrical conductor by either placing a turn of the conductor under the head of the screw or inserting a straight end of the conductor between the pressure plate 388 and the rectangular plate 380 and tightening the screw 386 to lock the conductor between the plates 380 and 388. Looking at side wall 306 of shell member 302, each of the two edges 303 of opening 384 contain a narrow vertical slot or rail 317 of uneven length adapted to receive and hold the side edges of the rectangular plate 380. Thus, by sliding the rectangular plate 380 of the brush terminal assembly 346 down into the slots or rails 317 in the edges of the opening 384, the brush terminal assembly is held in position within the opening 384 of the side wall 306 of the shell member 302.

The materials of the stationary terminal assembly 312 and the brush terminal assembly 346 are all conductive so that a circuit can be completed between conductor wires held in the assemblies. Preferably, these conductive components are all of substantial grade, and good quality electrical materials are used so that substantial currents, for example 10 or 20 amperes, can repeatedly be carried for extended periods of time without significant heat generation, electrical losses or excessive arcing. Such materials include silver alloys for the contacts, beryllium copper alloy for the brush arm and brass for the remaining conductive components.

Figure 16:
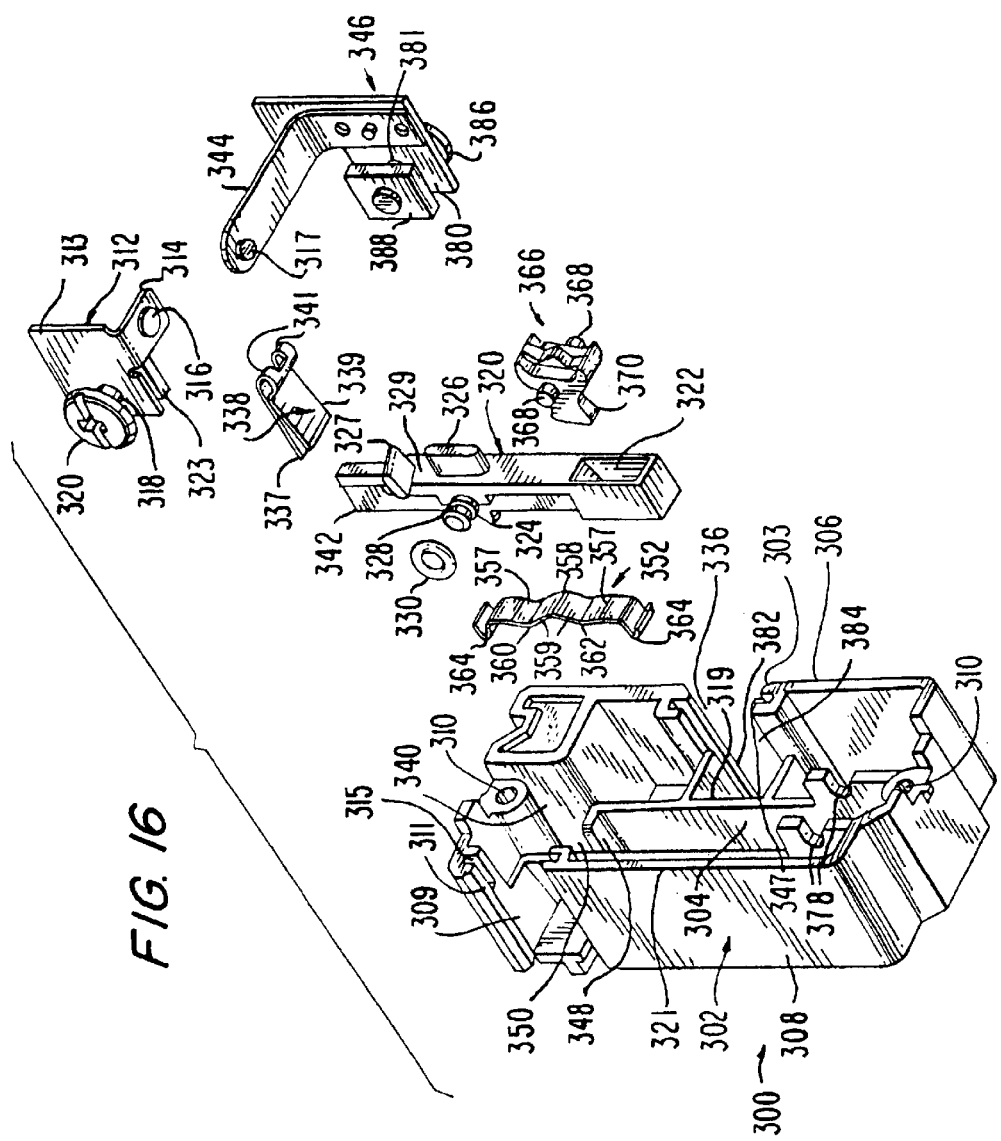
FIG. 16 is an exploded view of the single pole rocker paddle switch base assembly.
Figure 19:
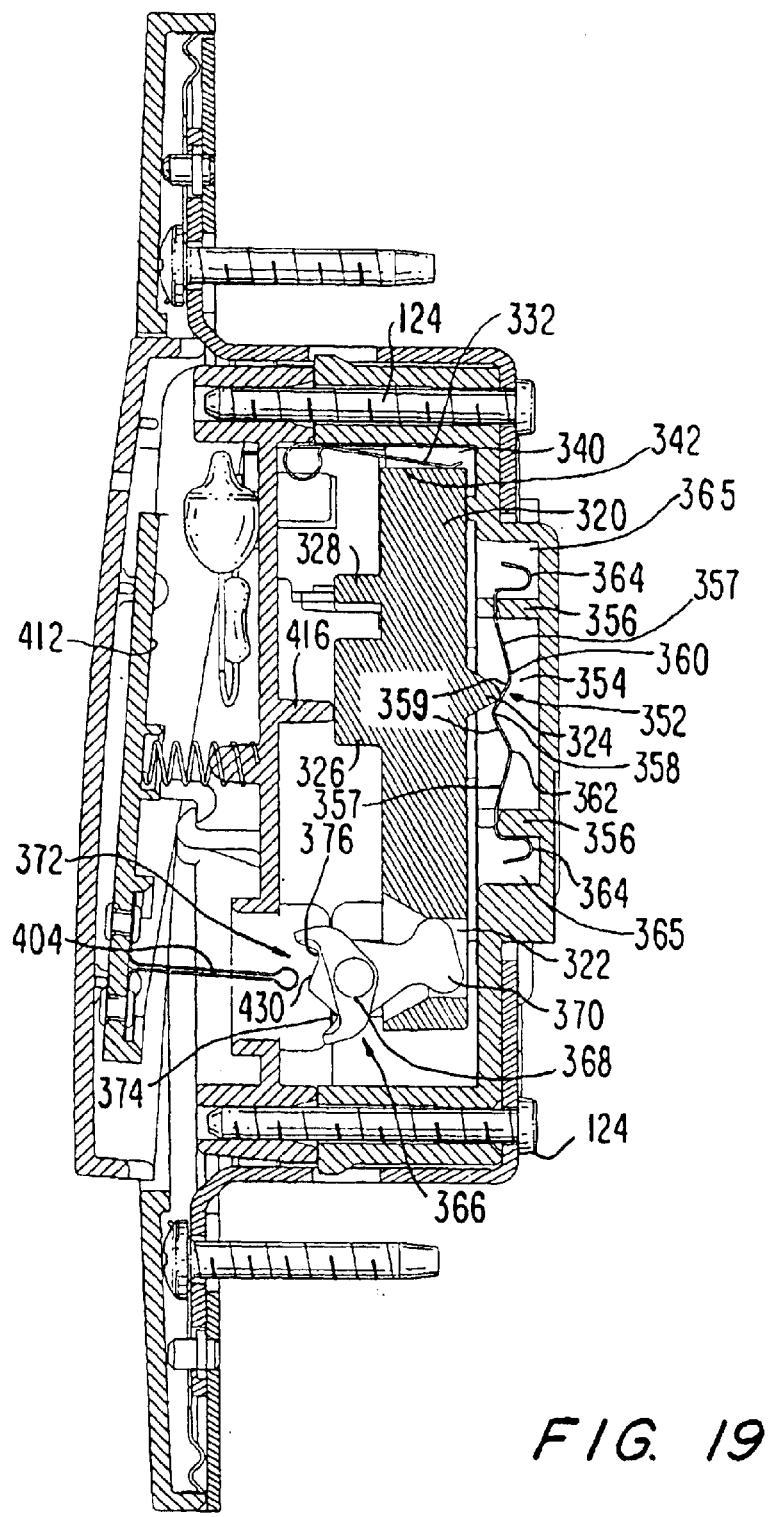
FIG. 19 is a view along the line 19—19 of FIG. 3.

Slider 320 located within channel 304 of shell member 302. Referring to FIGS. 16 and 19 (wherein the left end of FIG. 16 corresponds to the right end of FIG. 19), slider 320 is sized to freely slide back and forth between the side walls 319, 321 of channel 304. Slider 320 has, at one end, a substantially rectangular funnel shaped slot opening 322 which extends completely through the slider and is provided to receive a cam follower 370 of cam 366. Projecting downward from the bottom surface of slider 320 is a triangular shaped cam follower 324. Projecting upward from the top surface of the slider 320 is a hold down projection 326, and also projecting upward from the top of the slider is a brush terminal control projection 327. A space 329 located between hold down projection 326 and brush terminal control projection 327 is provided to receive the spring contact arm 344 of brush terminal assembly 346 to control the back and forth motion and final position of arm 344. A bumper support member 328 projects outward from a side of the slider. Positioned around bumper support member 328 is a rubber O ring 330. When the slider is located within slider receiving channel 304, O ring 330 moves back and forth between ends 332, 334 of opening 336 in side wall 321 as the slider is driven from one end of channel 304 to the other. The O ring is provided to cushion the stopping of the slider 320 by engaging ends 332, 334 of opening 336 in wall 321. Some versions of the switch, such as the single pole switch as here shown, may utilize a helper spring 338 to help offset the spring force that movable spring contact arm 344 exerts on the slider when the slider is moving the spring contact arm 344 to open the switch contacts. Helper spring 333 also helps to balance the feel of the rocker paddle as the switch is operated.

In the embodiment disclosed, the movable spring contact arm 344 is spring biased to move toward the stationary terminal assembly. Therefore, more force is needed by the slider to move the spring contact arm 344 out of engagement with the stationary contact than is needed to close the contacts. Helper spring 338 can be used to equalize this force. Helper spring 338 consists of two plates 337, 339 connected together at the top ends by two spring strips 341 and oriented relative to each other to form an inverted V spring member. The inverted V helper spring 338 fits in chamber 340 located at the left end of channel 304 (see FIG. 15). As slider 320 is moved to the left, the spring bias of spring contact arm 344 assists in this movement to close the contacts 316, 317. As the contacts close, the end 342 of slider 320 contacts and moves plate 339 of helper spring 338 toward plate 337. As this happens, helper spring 338 is compressed and biases slider 320 to move to the right. When the contacts of the switch are opened, slider 320 is moved to the right against the force of spring contact arm 344 and, as the slider moves to the right to open the contacts, the helper spring 338 helps the slider to move against the force of the spring contact arm 344. Thus, helper spring 338 is used to help overcome the force exerted by the spring contact arm 344 of the brush terminal 344 on the slider when the spring contact arm 34 is being moved to the right to open the switch contacts.

Wall 348 of chamber 340 contains a slot opening 350 which allows the end 342 of the slider to enter chamber 340 to engage and move plate 339 toward plate 337 of helper spring 338. Wall 348 also helps to retain the helper spring 338 within the chamber 340.

As best seen in FIG. 19, located directly beneath the slider receiving channel 304 and opening into channel 304 is spring chamber 354 which receives cam shaped leaf spring 352. Spring chamber 354 is elongated, has a rectangular cross section and is sized to receive flat cam shaped leaf spring 352. The spring chamber 354 is centrally and symmetrically disposed with regard to the center of the switch base 300 and contains spring support bars 356 at each end. Located beyond the spring support bars 356 are end pockets 365. The overall length of the chamber 354 depends upon the length of the flat cam shaped leaf spring 352.

Cam shaped leaf spring 352 is pressed to shape out of a flat resilient steel strip, preferably spring steel, and has the profile shown in FIG. 19. The forces applied to the triangular shaped cam 324 by the leaf spring 352 and the forces applied to the leaf spring by the cam 321 effects the movement and operation of the slider as is more fully explained below. Referring to flat cam shaped leaf spring 352, its profile is symmetrical about a center apex 358 from which a short cam portion 359 extends downwardly on each side of the apex 358 at an obtuse angle to each other, to a depression 360, 362 at the end of the cam portions and on each side of the apex, and then to support sections 357 on each side of the depressions. The support sections 357 are supported by bars 356 and terminate in U shaped outer end portions 364 which resides in end pockets 365. The apex 358, the centrally located rise of the spring, is relatively sharp. This is to say that the flat short cam portions 359 of each side of the apex are joined by support sections 357 which provide a surface discontinuity rather than a smooth transition in proceeding over the apex.

Continuing with FIG. 19, a cam 366 is used to move the slider back and forth between its left hand position and right hand position. Cam 366 has two projections 368, which extend out from each side and which are rotatably received in support bearing openings located in side walls 319, 321 of the slider receiving channel 304. Cam 366 rocks back and forth in a clockwise direction and a counterclockwise direction about an axes defined by the projections 368. Extending downward and below the projections is cam follower 370 which is adapted to be received by cam follower opening 322 located in slider 320 with minimum clearance. Extending upward from the projections 368 is cam control surface 372 having a first pocket 374 located to the left of the axes of rotation of the cam and a second pocket 376 located to the right of the axes of rotation of the cam. Looking at the profile of the cam 366 as shown in FIG. 19, pocket 372 is to the right of the axes of rotation of the cam, and pocket 374 is to the left of the axes of rotation of the cam. Thus, application of a downward force on pocket 372 will cause the cam to rotate in a clockwise direction and the cam follower 370 will cause the slider 320 to move to the left. In a similar way, the application of a downward force on pocket 374, when the slider is at its left hand position, will cause the cam to rotate in a counterclockwise direction and the cam follower will cause the slider to move to the right. A just noted, pressing down on pocket 372 causes the cam to rotate clockwise which causes the cam follower to move the slider to the left. Thereafter, pressing down on pocket 374 will now cause the cam to rotate counterclockwise to cause the cam follower to move the slider to the right. Pressing alternately on pockets 372 and 374 will cause the slider to slide back and forth first in one direction and then in the other direction.

Referring to FIG. 14, frame assembly 400 is adapted to fit on top of base assembly 300 and provides support for two contacts 390 which project through the frame assembly and make contact with rectangular plate 313 of the stationary terminal assembly and rectangular plate 380 of the brush terminal assembly 346. A resistor 392 connected in series with a lamp 394 such as an LED are connected across the two contacts 390. Lamp 394 indicates the conductive state of the switch by being "on" or "off". In operation, lamp 394 will be "on" when the contacts of the switch are open, and the lamp will be "off" when the contacts of the switch are closed.

Projecting upward from the frame assembly 400 are two hook members 396 which engage and pivotly hold rocker assembly 398 to frame assembly 400. In addition, frame assembly 400 includes a clearance opening 402 aligned with the top of cam 366 to permit the actuator 404 which is secured to the rocker assembly 398 to pass through the frame assembly 400 to engage and operate cam 366. A small projection 406 located on the frame assembly is used to engage the lower end of helical spring 408. The outside diameter of the projection 406 is less than the inside diameter of the helical spring 408 and fits within the helical spring. The upper end of spring 408 is located within and is held captive in a pocket 410 located in a subplate 412 secured to the underside of the rocker assembly.

Figure 17:
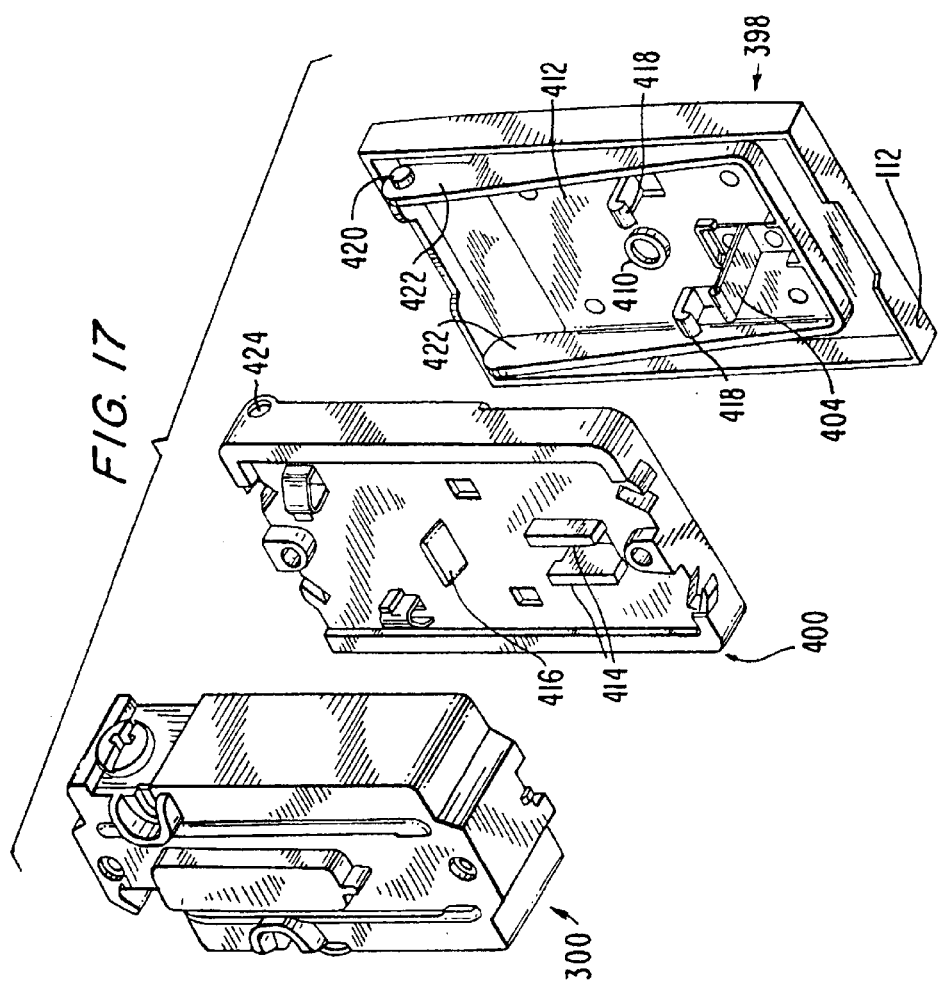
FIG. 17 is another exploded view of the single pole rocker paddle switch.

Referring to FIGS. 17 and 19, there is shown a view of the bottom of base assembly 300, frame assembly 400 and the rocker assembly 398 of a single pole switch. Referring to the frame assembly 400, projecting out from the bottom surface are two projections 414 which are positioned to contact the top surface of projections 368. Projections 368 keep the projections in the bearing surfaces in the side walls of the slider receiving channel. Also projecting downward from the bottom surface is a slider hold down projection 416 which slidably contacts holding down projection 326 on the slider 320. Projection 416, by contacting projection 326, prevents slider 320 from being pushed up and out of channel 304 by the upward force of cam profile leaf spring 352 acting on triangular shaped cam follower 324.

As noted above, subplate 412 is attached to the bottom of rocker paddle 112. Attached to and projecting down from subplate 412 is an actuator 404 made of a single strip of thin, flat spring steel bent to form a U shaped member having a generous radius at the bend. The ends of the U shaped member are bent outward to form two outwardly projecting legs. A small hole punched in each leg of actuator 404 is used to rivet or heat staked the actuator to the subplate 412. The thin flat spring steel actuator 404 can flex slightly towards the front and back of the switch. The ability of the actuator 404 to flex permits it to more easily engage the first pocket 374 and the second pocket 376 of the cam 366. By alternately pressing the rocker paddle 112 the actuator 404 alternately engages the pocket of the cam to alternately open and close the switch contacts. Two hooks 418 which project down from the surface of the subplate 412 are positioned to engage hooks 396 on the frame assembly 400. Hooks 418, when engaged by hooks 396 allow limited movement of the rocker assembly relative to the frame assembly and prevent the rocker assembly 398 from being separated from the frame assembly 400. Two circular projections 420, one on the outside surface of an end of each of two legs 422 which project from the subplate are designed to snap into openings 424 in the frame assembly 400 to form a hinge about which the subplate pivots relative to the frame assembly and base assembly. The subplate is heat staked to the bottom surface of the rocker paddle 112 to form a unitary assembly.

Referring to FIG. 19, to assemble the rocker paddle switch, the helper spring 338 is inserted into end chamber 340, leaf spring 352 is place into spring chamber 354 and slider 320 is placed into channel 304. The end 342 of the slider faces the helper spring 338 and the triangular shaped cam follower 324 which projects from the bottom of the slider slidably engages the top surface of leaf spring 352. The projections 368 of the cam 366 are placed within the bearing surfaces 378 of side walls 319, 321 of channel 304 with the cam follower 370 being positioned within opening 322 of slider 320. Stationary terminal assembly 312 is positioned in the opening 309, and brush terminal assembly 346 is positioned within opening 384. As the brush terminal assembly 346 is being placed in position, the spring contact arm 344 is moved backward against the force of the spring arm and is positioned within the slot 329 located between the holding down projection 326 and the spring contact arm control member 327. At this time all the various components (see FIG. 16) have been placed within the switch base 300 and the assemblage resembles that shown in FIG. 15.

The frame assemblage 400, which may include the lamp 394, resistor 392 and contacts 390, is now placed over the switch base, a ground strap is placed along the bottom and ends of base assembly 300, and screws, drive pins, rivets or the like 124 are used to lock the ground strap, switch base assemblage and frame assemblage together. Following this, helical return spring 408 is placed over projection 406, care being taken to locate the top of the return spring within the spring pocket of the subplate, and the projections 420 on the legs 422 are snapped into the openings 424 in the frame assembly 400 to form the hinge for rocker assembly 398 and the frame assembly 400 to move relative to each other. Then the rocker assembly 398 which includes the subplate, is pressed down toward the frame assembly until the hooks 418 engage the hooks 396. At this time the actuator 404, which has been attached to the subplate extends down through the clearance opening 402 in the frame 400 and is positioned to engage the cam eccentric surface 372.

Referring to FIG. 19, there is shown a sectional view of a single pole switch where the contacts of the switch are closed and the switch is in its conducting state. The next time the face of the rocker paddle is pressed, the actuator 404 moves down, contacts the ramp 430 of cam surface 372 and slides toward the right and enters pocket 376. Continued pressing on the rocker paddle causes the actuator 404 to continue to move down and to rotate the cam 366 clockwise about the projections 368. This causes cam follower 370 to rotate in a clockwise direction to move slider 320 to the left. As the slider 320 moves toward the left, the triangular shaped cam follower 324 starts to move out of depression 360 and across the right support section 359 of the centrally located apex 358 of the cam shaped leaf spring 352. As the slider continues to move to the left, triangular shaped cam 324 deflects leaf spring 352 downward because projection 326 on slider 320, in cooperation with holding projection 416, prevents the slider 320 from moving upward. As the triangular shaped cam 324 moves passed the top of the apex 358 to the left support section 359 of the apex, the leaf spring starts to spring back to its original unstressed position by moving up. This upward movement of the leaf spring acts on the shaped cam follower 324 and helps drive the cam follower 324 and the slider 320 to the left until the cam follower 324 comes to rest in depression 362. At this time the contacts of the switch are separated from each other. Thus, the cam shaped leaf spring 352, in combination with the cam follower 324 helps to move the slider to either the left or right depressions 362, 360 and to rapidly open and close the contacts. The next time that the rocker is depressed, the actuator 404 will engage pocket 374 of the cam to cause it to rotate in a counterclockwise direction which will cause the slider to depress the leaf spring as it moves to the right. As the cam follower 324 continues to move to the right and as it passes apex 358, the depressed leaf spring starts to spring up to return to its original position. This upward movement of the leaf spring causes the cam follower 324 to move toward the right until it reaches depression 360 at which time the switch contacts are closed. Continued pressing and releasing the rocker paddle of the switch alternately opens and closes the contacts of the switch. If desired, the state of conduction of the switch can be displayed to a user by the lamp-resistor combination connected in series across the stationary and brush terminal assemblies. When the contacts of the switch are closed, there is no potential difference across the lamp-resistor combination and the lamp will remain dark. When the contacts of the switch are open, there will be a potential difference across the lamp-resistor combination and the lamp will be lit.

Figure 20:
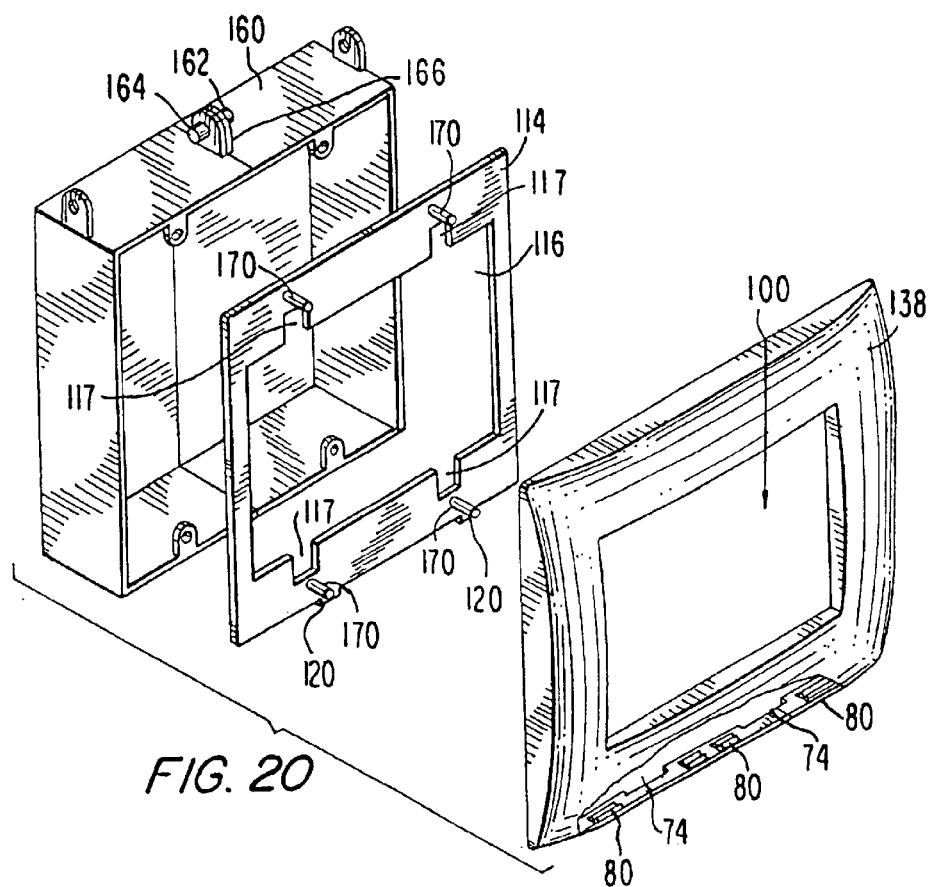
FIG. 20 is an exploded view of a box, alignment plate and wall plate for two wiring devices.

Referring to FIG. 20, there is illustrated a wall plate for positioning two wiring devices such as two rocker paddle switches positioned side by side. It is to be noted that there is no partition or dividing member located in either the wall plate opening or the alignment plate opening to separate the two wiring devices. The two wiring devices can be placed in a double ganged box 160 made up, as an example, of two single boxes joined by fasteners 162 extending through the threaded apertures 164 of two joining ears 166. Alignment plate 114 has a single opening 116, four clearance openings 117 and four alignment pins 170 for receiving two wiring devices such as two switches, a receptacle and a switch, or two receptacles.

Looking at the wall plate 138, there can be four racks 80 on the interior of the top and bottom end walls for receiving four pawls where the two center racks receive one pawl from each wiring device. Also, there can be tow tabs 120, which will be accessible via slots 74 in end wall 70 of cover plate 138. Because of the independent operation of the pawls 140 with their respective racks 80, the wall plate 138 can compensate somewhat for lack of flatness of the wall in which the wiring devices are installed.

Figure 21:
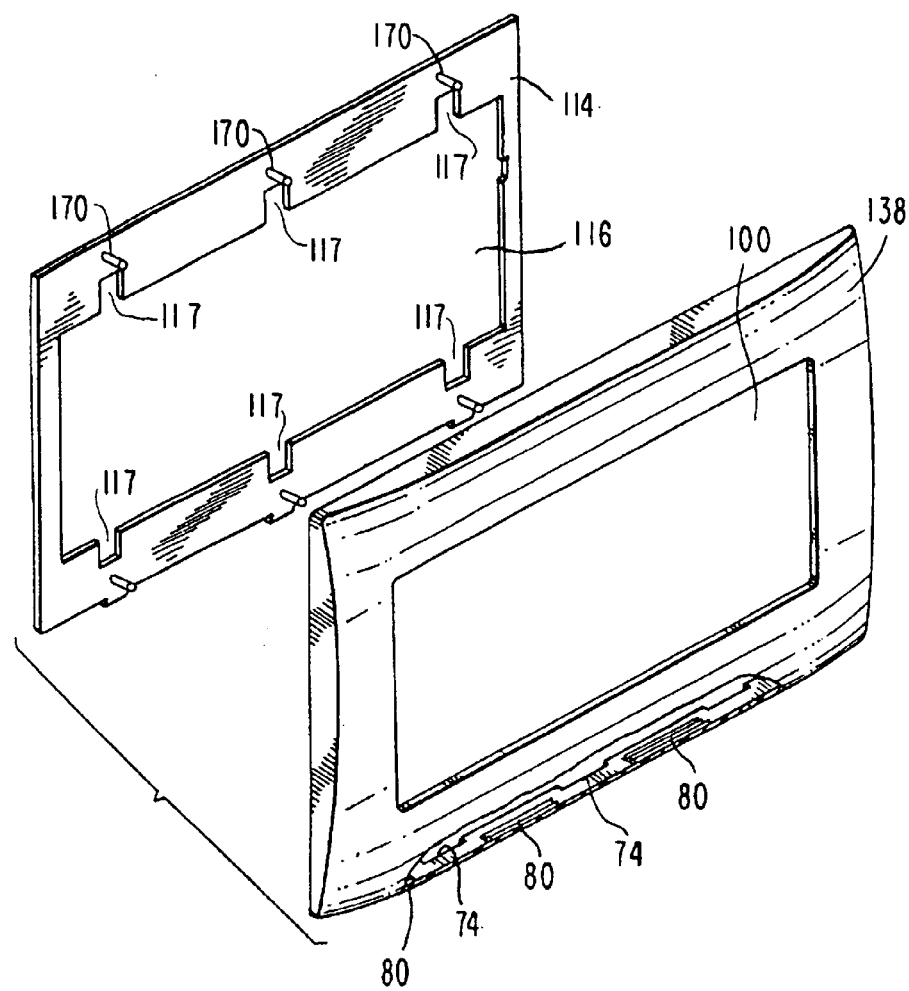
FIG. 21 is an exploded view of an alignment plate and wall plate for three wiring devices; and, FIG. 22 is an exploded view of an alignment plate and wall plate for four wiring devices.

Referring to FIG. 21 there is shown an alignment plate 114 having a single opening 116 and a wall plate 138 for three wiring devices mounted in three boxes (not illustrated) ganged together. Wall plate 138 has a single opening 100 with no dividing or separating members for receiving three wiring devices positioned side by side and can have four sets of racks 80 where the two end racks each receive a single pawl and the two center racks receive two pawls. The alignment plate 114 has a single opening 116 with no dividing or separating members, three sets of clearance openings 117 and three sets of alignment pins 170 for receiving three wiring devices.

FIG. 23 shows an alignment plate 114 having a single opening 116 with no dividing or separating members and wall plate 138 for four wiring devices mounted in four boxes (not illustrated) ganged together. Wall plate 138 has a single opening 100 with no dividing or separating members for receiving four wiring devices positioned side by side and the alignment plate 114 has a single opening 116 with no dividing or separating members for receiving four wiring devices positioned side by side.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

What is claimed is:

1. An electrical rocker paddle switch comprising:
   a switch housing:
   a manually movable rocker paddle coupled to the housing;
   actuator means having a first end and a second end, said actuator means attached to the rocker paddle at the first end and movable in response to the movement of the rocker paddle;
   cam means driven by the second end of the actuator means to alternately rotate in a first and second opposite direction as the rocker paddle is alternately depressed;
   slider means having a slider position determining cam follower coupled to be moved alternately in a first and a second opposite direction along a common linear axis by rotation of the cam means in the first and second opposite direction;
   a fixed stationary contact and a movable brush contact mounted to the switch housing, the movable brush contact biased to contact the fixed stationary contact to thereby electrically close the switch, the movable brush contact being movable by the slider means to disengage the fixed stationary contact to thereby electrically open the switch; and
   a cam shaped leaf spring positioned within the switch housing and coupled to the slider position determining cam follower on the slider means to aid in the movement of the slider means.

2. The electrical rocker paddle switch of claim 1 wherein the actuator means comprises a flat strip member that can flex in a direction along the length of the switch.

3. The electrical rocker paddle switch of claim 1, wherein the slider means comprises a tapered opening for receiving therein the cam means, the tapered opening having predetermined dimensions to provide a fit with the cam means inserted therein whereby substantially all of the rotating motion of the cam means is applied to the slider means to move the movable brush contact.

4. The electrical rocker paddle switch of claim 1, wherein the switch housing further comprises a switch base having separate chambers therein for individually housing the slider and the cam shapes leaf spring.

5. The electrical rocker paddle switch of claim 4 wherein the chamber for housing the cam shaped leaf spring has a length greater than that of the cam shaped leaf spring such that the ends of the spring are not constrained.

6. The electrical rocker paddle switch of claim 4 wherein the rocker paddle is pivotly coupled to the switch housing.

7. The electrical rocker paddle switch of claim 6 further comprising a window in the rocker paddle to pass light from illumination means mounted in the switch housing.

8. The electrical rocker paddle switch of claim 7 wherein the illumination means comprises a light bulb and a voltage dropping resistor connected in series with the light bulb.

9. The electrical rocker paddle switch of claim 4 further comprising front and rear wire clamp means mounted to the switch housing and coupled to the fixed stationary contact and the movable brush contact.

10. The electrical rocker paddle switch of claim 4 further comprising a unitary mounting strap attached to the switch housing, the mounting strap providing a cradle like support for holding the switch in a wall box.

11. The electrical rocker paddle switch of claim 10 wherein the mounting strap is made of sheet metal.

12. The electrical rocker paddle switch of claim 1 wherein the manually movable rocker paddle has a vertical axis along its length and a horizontal axis along its width wherein the surface of the rocker paddle along its vertical axis has a contour of positive first differential comprised of a combination of splines drawn between points of varying distances from a datum plane.

13. The electrical rocker paddle switch of claim 12 wherein the surface along the vertical axis has a contour of zero second differential comprised of splines drawn between points of varying distance from a datum plane when the rate of height increase of the individual splines is constant.

14. The electrical rocker paddle switch of claim 12 wherein a section along the horizontal axis has a surface with contour of a positive first differential and negative second differential, comprised of a combination of splines drawn between points of varying distances from the datum plane.

15. The electrical rocker paddle switch of claim 12 wherein a section along the vertical axis of the surface of the paddle has a contour of positive first differential, comprised of splines drawn between points of varying distance from a datum plane, and a section along the horizontal axis has a surface contour of a positive first differential and negative second differential, comprised of a combination of splines drawn between points of varying distances from the datum plane.

16. The electrical rocker paddle switch of claim 15 wherein the section along the vertical axis of the surface has a contour of zero second differential comprised of splines drawn between points of varying distances from a datum plane when the rate of height increase of the individual splines is constant.

17. The electrical rocker paddle switch of claim 12 wherein the paddle is not within a frame.

18. An electrical rocker paddle switch comprising:
   a switch housing:
   a manually movable rocker paddle coupled to the housing;
   actuator means having a first end and a second end, said actuator means attached to the rocker paddle at the first end and movable in response to the movement of the rocker paddle;
   cam means driven by the second end of the actuator means to alternately rotate in a first and second opposite direction as the rocker paddle is alternately depressed
   slider means having a slider position determining cam follower coupled to be moved alternately in a first and a second opposite direction along a common linear axis by rotation of the cam means in the first and second opposite direction;
   a fixed stationary contact and a movable brush contact mounted to the switch housing, the movable brush contact biased to contact the fixed stationary contact to thereby electrically close the switch, the movable brush contact being movable by the slider means to disengage the fixed stationary contact to thereby electrically open the switch; and a cam shaped leaf spring positioned within the switch housing and coupled to the slider position determining cam follower on the slider means to aid in the movement of the slider means;

the cam shaped leaf spring being substantially symmetrical about a central apex comprised of two relatively short cam portions which extend downward, respectively on each side of the apex forming an obtuse angle where, at each end of each short cam portions there is an upward extending portion to form a depressions with each relatively short cam portion, where, thereafter, each upward extending portion rests on support means and the ends of the upward extending portions beyond the support means are bent downward.

19. The electrical rocker paddle switch of claim 18 wherein the manually movable rocker paddle has a vertical axis along its length and a horizontal axis along its width wherein the surface of the paddle along its vertical axis has a contour of positive first differential comprised of a combination of splines drawn between points of varying distances from a datum plane.

20. The electrical rocker paddle switch of claim 19 wherein the surface along the vertical axis has a contour of zero second differential comprised of splines drawn between points of varying distance from a datum plane when the rate of height increase of the individual splines is constant.

21. The electrical rocker paddle switch of claim 19 wherein a section along the horizontal axis has a surface with contour of a positive first differential and negative second differential, comprised of a combination of splines drawn between points of varying distances from the datum plane.

22. The electrical rocker paddle switch of claim 19 wherein a section along the vertical axis of the surface of the paddle has a contour of positive first differential, comprised of splines drawn between points of varying distance from a datum plane, and a section along the horizontal axis has a surface contour of a positive first differential and negative second differential, comprised of a combination of splines drawn between points of varying distances from the datum plane.

23. The electrical rocker paddle switch of claim 22 wherein the section along the vertical axis of the surface has a contour of zero second differential comprised of splines drawn between points of varying distances from a datum plane when the rate of height increase of the individual splines is constant.

24. The electrical rocker paddle switch of claim 19 wherein the paddle is not within a frame.

25. An electrical rocker paddle switch comprising:

a switch housing:

a manually movable rocker paddle coupled to the housing;

actuator means having a first end and a second end, said actuator means attached to the rocker paddle at the first end and movable in response to the movement of the rocker paddle;

cam means driven by the second end of the actuator means to alternately rotate in a first and second opposite direction as the rocker paddle is alternately depressed slider means having a slider position determining cam follower coupled to be moved alternately in a first and a second opposite direction along a common linear axis by rotation of the cam means in the first and second opposite direction;

a fixed stationary contact and a movable brush contact mounted to the switch housing, the movable brush contact biased to contact the fixed stationary contact to thereby electrically close the switch, the movable brush contact being movable by the slider means to disengage the fixed stationary contact to thereby electrically open the switch; and a cam shaped leaf spring positioned within the switch housing and coupled to the slider position determining cam follower on the slider means to aid in the movement of the slider means;

the cam shaped leaf spring being substantially symmetrical about a central apex comprised of two relatively short cam portions which extend downward, respectively on each side of the apex forming an obtuse angle where, at each end of each short cam portions there is an upward extending portion to form a depressions with each relatively short cam portion, where, thereafter, each upward extending portion rests on support means and the ends of the upward extending portions beyond the support means are bent downward;

the switch housing further including a switch base having separate chambers therein for individually housing the slider means and the cam shaped leaf spring.

* * * * *